United States Patent
Garbas et al.

(10) Patent No.: US 9,712,816 B2
(45) Date of Patent: Jul. 18, 2017

(54) INTER-LAYER PREDICTION BETWEEN LAYERS OF DIFFERENT DYNAMIC SAMPLE VALUE RANGE

(71) Applicant: FRAUNHOFER-GESELLSCHAFT ZUR FOERDERUNG DER ANGEWANDTEN FORSCHUNG E.V., Munich (DE)

(72) Inventors: Jens-Uwe Garbas, Erlangen (DE); Herbert Thoma, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 333 days.

(21) Appl. No.: 14/273,376

(22) Filed: May 8, 2014

(65) Prior Publication Data
US 2014/0241418 A1   Aug. 28, 2014

Related U.S. Application Data

(63) Continuation of application No. PCT/EP2012/058227, filed on May 4, 2012.
(Continued)

(51) Int. Cl.
*H04N 7/12* (2006.01)
*H04N 19/11* (2014.01)
(Continued)

(52) U.S. Cl.
CPC ....... *H04N 19/00042* (2013.01); *H04N 19/11* (2014.11); *H04N 19/14* (2014.11);
(Continued)

(58) Field of Classification Search
None
See application file for complete search history.

(56) References Cited

U.S. PATENT DOCUMENTS 8,982,963 B2   3/2015   Vogt et al.
8,995,525 B2   3/2015   Winken et al.
(Continued)

FOREIGN PATENT DOCUMENTS

EP   1827024   8/2007
EP   2051529   4/2009
(Continued)

OTHER PUBLICATIONS

Ajit, Motra et al., "An adaptive Logluv transform for High Dynamic Range video compression", 17th IEEE International Conference on Image Processing (ICIP 2010); Hong Kong, Sep. 26, 2010, pp. 2061-2064.
(Continued)

*Primary Examiner* — Dakshesh Parikh
(74) *Attorney, Agent, or Firm* — Michael A. Glenn; Perkins Coie LLP

(57) ABSTRACT

The ratio between coding quality on the one hand and coding rate on the other hand is increased. To this end, a global predictor and a local predictor are used in combination. The global predictor derives a global tone-mapping function based on a statistical analysis of pairs of values of co-located samples in the first tone-mapped version and the second version of the picture, and applies the global tone-mapping function onto the first tone-mapped version of the picture. The local predictor locally derives a locally varying tone-mapping function based on a statistical analysis of values of co-located samples in the second version of the picture and the globally predicted reference picture in units of sub-portions into which the globally predicted reference picture and the second version of the picture are partitioned, and applies the locally varying tone-mapping function onto the globally predicted reference picture.

26 Claims, 6 Drawing Sheets

Related U.S. Application Data

(60) Provisional application No. 61/557,675, filed on Nov. 9, 2011.

(51) Int. Cl.

| | | |
|---|---|---|
| *H04N 19/176* | (2014.01) | |
| *H04N 19/147* | (2014.01) | |
| *H04N 19/172* | (2014.01) | |
| *H04N 19/46* | (2014.01) | |
| *H04N 19/196* | (2014.01) | |
| *H04N 19/463* | (2014.01) | |
| *H04N 19/14* | (2014.01) | |
| *H04N 19/17* | (2014.01) | |
| *H04N 19/39* | (2014.01) | |
| *H04N 19/167* | (2014.01) | |
| *H04N 19/98* | (2014.01) | |

(52) U.S. Cl.
CPC ......... *H04N 19/147* (2014.11); *H04N 19/167* (2014.11); *H04N 19/17* (2014.11); *H04N 19/172* (2014.11); *H04N 19/176* (2014.11); *H04N 19/196* (2014.11); *H04N 19/39* (2014.11); *H04N 19/46* (2014.11); *H04N 19/463* (2014.11); *H04N 19/98* (2014.11)

(56) References Cited

U.S. PATENT DOCUMENTS

| | | |
|---|---|---|
| 2008/0165855 A1 | 7/2008 | Wang et al. |
| 2009/0097558 A1 | 4/2009 | Ye et al. |
| 2009/0175338 A1 | 7/2009 | Segall |
| 2011/0194618 A1* | 8/2011 | Gish .................. G06T 5/50 375/240.25 |

FOREIGN PATENT DOCUMENTS

| | | | |
|---|---|---|---|
| JP | 2011517245 A | 5/2011 | |
| JP | 2012520619 A | 9/2012 | |
| RU | 2426267 C2 | 8/2011 | |
| WO | WO-2007082562 | 7/2007 | |
| WO | WO-2008043198 | 4/2008 | |
| WO | WO-2009127231 | 10/2009 | |
| WO | WO-2010105036 | 9/2010 | |
| WO | WO2010105036 A1 * | 9/2010 | ............ G06T 5/50 |

OTHER PUBLICATIONS

Garbas, et al., "Inter-Layer Prediction for Backwards Compatible High Dynamic Range Video Coding with SVC", PCS 2012, Krakow, May 2012, pp. 285-288.

Liu, et al., "Bit-depth scalable coding for high dynamic range video", Visual Communications and Image Processing; San Jose, California, Jan. 2008, 10 pages.

Segall, et al., "CE1: Inter-layer prediction for SVC bit-depth scalability", Joint Video Team of ISO/IEC JTC1/SC29/WG11 and ITU-T SG. 16, Oct. 2007, 6 pages.

* cited by examiner

INTER-LAYER PREDICTION BETWEEN LAYERS OF DIFFERENT DYNAMIC SAMPLE VALUE RANGE

CROSS-REFERENCE TO RELATED APPLICATIONS

This application is a continuation of copending International Application No. PCT/EP2012/058227, filed May 4, 2012, which is incorporated herein by reference in its entirety, and additionally claims priority from U.S. Application No. 61/557,675, filed Nov. 9, 2011, which is also incorporated herein by reference in its entirety.

The present invention is concerned with inter-layer prediction between layers of different dynamic sample value range in picture and/or video coding.

BACKGROUND OF THE INVENTION

The human visual system can perceive luminance ranges of about 8 orders of magnitude and about 5 orders simultaneously when adapted to a certain light condition [1]. In contrast, until a few years ago, the dynamic range of most video capture and display devices was limited to about two orders of magnitude. Today, with the introduction of commercial HDR displays, a dramatically increased realism can be expected when the full visible light range is transmitted via HDR video [1]. In order to allow for a seamless transition from LDR to HDR video, backwards compatibility of such a future HDR coding standard would be extremely useful to allow playback on legacy devices. So far, in the literature there exist only a few approaches to backwards compatible HDR video coding [2-6]. Whereas the approach in [2] is based on an implementation of the advanced simple profile of an MPEG-4 codec with a bit depth of 8 bit, [3-6] are extensions of the scalable video coding profile of H.264/AVC (aka. as SVC). SVC allows for bit depths of more than 8 bit.

In all cases, before encoding, the LDR video sequence has to be generated from the original HDR video data via tone-mapping. Tone-mapping operators (TMO) can operate on the whole image globally (global methods), locally (local methods), or both. A comprehensive introduction to the most important TMO is given in the textbook [1]. The process that reconstructs an HDR video sequence from an LDR video can be denoted as inverse tone-mapping (ITMO) or advantageously inter-layer prediction (ILP) when it is used for scalable video coding [3]. In this context the ILP has the task of reducing the redundancy between LDR and HDR layers to reduce the useful bit rate for transmitting the residual information. In a coding scenario, the ILP should work agnostic w.r.t. to the chosen TMO to be generally efficient. For example, in [2] and [4] the authors propose to use a simple mapping function to globally scale each LDR frame or even the whole LDR sequence to the dynamic range of the HDR sequence. However, the efficiency of this predictor is low whenever the LDR video was generated by a locally adaptive TMO (which usually produces more attractive LDR videos).

The approaches in [3-6] exhibit some local adaptivity, by using a block-wise ILP, however they are operating in a color space that is not suited for transmitting HDR data. Furthermore, they have only limited capabilities for ILP parameter estimation and the useful side information is inefficiently coded.

SUMMARY

According to an embodiment, an apparatus for performing inter-layer prediction between a first picture coding stage for coding a first tone-mapped version of a picture, having a first dynamic sample value range, and a second picture coding stage for coding a second version of the picture, having a second dynamic sample value range greater than the first dynamic sample value range, may have: a global predictor configured to derive a global tone-mapping function based on a statistical analysis of pairs of values of co-located samples in the first tone-mapped version and the second version of the picture, and apply the global tone-mapping function onto the first tone-mapped version of the picture so as to achieve a globally predicted reference picture for the second version of the picture; and a local predictor configured to locally derive a locally varying tone-mapping function based on a statistical analysis of values of co-located samples in the second version of the picture and the globally predicted reference picture in units of sub-portions into which the globally predicted reference picture and the second version of the picture are partitioned, and apply the locally varying tone-mapping function onto the globally predicted reference picture so as to achieve a globally and locally predicted reference picture for the second version of the picture, wherein the local predictor is configured to, in locally deriving the locally varying tone-mapping function, for each sub-portion, determine a slope and an intercept of a regression line through a distribution of pairs of values of co-located samples in the respective sub-portion of the second version of the picture and the globally predicted reference picture, and encode the slope and the intercept determined for the sub-portions as side information into an enhancement datastream generated by the second picture coding stage, and forming an enhancement layer relative to a datastream output by the first picture coding stage, and wherein the second picture coding stage is configured to lossy code a prediction residual between the globally and locally predicted reference picture and the second version of the picture into an enhancement datastream, and the local predictor is configured to encode the slope determined for the respective sub-portion as a prediction residual of a spatial prediction from the slope of a neighboring sub-portion the slope of which has been previously encoded, fit a straight line having the slope of the respective sub-portion, into a distribution of pairs of values of co-located samples in the neighboring sub-portion of the second version of the picture as far as reconstructible based on the prediction residual and the globally and locally predicted reference picture on the one hand, and the globally predicted reference picture on the other hand and determine the intercept of the straight line; and encode the intercept of the respective sub-portion as a prediction residual relative to a spatial intercept prediction depending on the intercept of the straight line.

According to another embodiment, an apparatus for performing inter-layer prediction between a first picture decoding stage for decoding a first tone-mapped version of a picture, having a first dynamic sample value range, and a second picture decoding stage for decoding a second version of the picture, having a second dynamic sample value range greater than the first dynamic sample value range, may have: a global predictor configured to derive a global tone-mapping function from side information of an enhancement datastream of the second picture decoding stage and globally apply the global tone-mapping function onto samples of the first tone-mapped version of the picture so as to achieve a globally predicted reference picture for the second version of the picture; and a local predictor configured to locally derive a locally varying tone-mapping function from the side information in units of sub-portions into which the globally predicted reference picture and the second version of the picture are partitioned, and apply the locally varying tone-mapping function onto the globally predicted reference picture so as to achieve a globally and locally predicted reference picture for the second version of the picture, wherein the local predictor is configured to, in locally deriving the locally varying tone-mapping function, reconstruct, for each sub-portion, a slope and an intercept from the side information, and in applying the locally varying tone-mapping function onto the globally predicted reference picture, weight, for each sub-portion, samples of the globally predicted reference picture in the respective sub-portion using the slope and adding the intercept to same, wherein the local predictor is configured to sequentially derive the slope and the intercept for the sub-portions from the side information by decoding slope and intercept residuals for the sub-portions from the side information, spatially predicting the slope for a current sub-portion from the slope of a neighboring sub-portion previously reconstructed to achieve a slope prediction; reconstructing the slope for the current sub-portion based on the slope prediction and the slope residual for the current sub-portion; fitting a straight line having the slope of the current sub-portion, into a distribution of pairs of values of co-located samples in the neighboring sub-portion of the second version of the picture and the globally predicted reference picture and determine the intercept of the straight line to achieve an intercept prediction; and reconstructing the intercept of the current sub-portion based on the intercept prediction and the intercept residual for the current sub-portion.

According to another embodiment, a method for performing inter-layer prediction between a first picture coding stage for coding a first tone-mapped version of a picture, having a first dynamic sample value range, and a second picture coding stage for coding a second version of the picture, having a second dynamic sample value range greater than the first dynamic sample value range may have the steps of: deriving a global tone-mapping function based on a statistical analysis of pairs of values of co-located samples in the first tone-mapped version and the second version of the picture; applying the global tone-mapping function onto the first tone-mapped version of the picture so as to achieve a globally predicted reference picture for the second version of the picture; locally deriving a locally varying tone-mapping function based on a statistical analysis of values of co-located samples in the second version of the picture and the globally predicted reference picture in units of sub-portions into which the globally predicted reference picture and the second version of the picture are partitioned, and applying the locally varying tone-mapping function onto the globally predicted reference picture so as to achieve a globally and locally predicted reference picture for the second version of the picture, wherein the local derivation of the locally varying tone-mapping function, includes, for each sub-portion, determining a slope and an intercept of a regression line through a distribution of pairs of values of co-located samples in the respective sub-portion of the second version of the picture and the globally predicted reference picture, and the method further includes encoding the slope and the intercept determined for the sub-portions as side information into an enhancement datastream generated by the second picture coding stage, and forming an enhancement layer relative to a datastream output by the first picture coding stage, and wherein the second picture coding stage includes lossy coding a prediction residual between the globally and locally predicted reference picture and the second version of the picture into an enhancement datastream, and the encoding the slope and the intercept includes encoding the slope determined for the respective sub-portion as a prediction residual of a spatial prediction from the slope of a neighboring sub-portion the slope of which has been previously encoded, fitting a straight line having the slope of the respective sub-portion, into a distribution of pairs of values of co-located samples in the neighboring sub-portion of the second version of the picture as far as reconstructible based on the prediction residual and the globally and locally predicted reference picture on the one hand, and the globally predicted reference picture on the other hand and determine the intercept of the straight line; and encoding the intercept of the respective sub-portion as a prediction residual relative to a spatial intercept prediction depending on the intercept of the straight line.

According to another embodiment, a method for performing inter-layer prediction between a first picture decoding stage for decoding a first tone-mapped version of a picture, having a first dynamic sample value range, and a second picture decoding stage for decoding a second version of the picture, having a second dynamic sample value range greater than the first dynamic sample value range, may have the steps of: deriving a global tone-mapping function from side information of an enhancement datastream of the second picture decoding stage; globally applying the global tone-mapping function onto samples of the first tone-mapped version of the picture so as to achieve a globally predicted reference picture for the second version of the picture; locally deriving a locally varying tone-mapping function from the side information in units of sub-portions into which the globally predicted reference picture and the second version of the picture are partitioned, and applying the locally varying tone-mapping function onto the globally predicted reference picture so as to achieve a globally and locally predicted reference picture for the second version of the picture, wherein the local derivation of the locally varying tone-mapping function includes reconstructing, for each sub-portion, a slope and an intercept from the side information, and the application of the locally varying tone-mapping function onto the globally predicted reference picture, includes weighting, for each sub-portion, samples of the globally predicted reference picture in the respective sub-portion using the slope and adding the intercept to same, wherein the method includes sequentially deriving the slope and the intercept for the sub-portions from the side information by decoding slope and intercept residuals for the sub-portions from the side information, spatially predicting the slope for a current sub-portion from the slope of a neighboring sub-portion previously reconstructed to achieve a slope prediction; reconstructing the slope for the current sub-portion based on the slope prediction and the slope residual for the current sub-portion; fitting a straight line having the slope of the current sub-portion, into a distribution of pairs of values of co-located samples in the neighboring sub-portion of the second version of the picture and the globally predicted reference picture and determine the intercept of the straight line to achieve an intercept prediction; and reconstructing the intercept of the current sub-portion based on the intercept prediction and the intercept residual for the current sub-portion.

Another embodiment may have a computer program for performing, when running on a computer, the method of claim 23.

Another embodiment may have a computer program for performing, when running on a computer, the method of claim 24.

A basic finding of the present invention is that the ratio between coding quality on the one hand and coding rate on the other hand may be increased if a global predictor and a local predictor are used in combination. The global predictor derives a global tone-mapping function based on a statistical analysis of pairs of values of co-located samples in the first tone-mapped version and the second version of the picture, and applies the global tone-mapping function onto the first tone-mapped version of the picture to obtain a globally predicted reference picture for the second version of the picture. The local predictor locally derives a locally varying tone-mapping function based on a statistical analysis of values of co-located samples in the second version of the picture and the globally predicted reference picture in units of sub-portions into which the globally predicted reference picture and the second version of the picture are partitioned, and applies the locally varying tone-mapping function onto the globally predicted reference picture to obtain a globally and locally predicted reference picture for the second version of the picture. At the decoding side, a global predictor and a local predictor are also present, each deriving the global tone-mapping function and the locally varying tone-mapping function from side information of an enhancement data stream.

In accordance with embodiments of the present invention, the global prediction is suppressible. That is, in accordance with these embodiments, the global predictor is configured to suppress the application of the global tone-mapping function in case of a scattering of the pairs of the values of the co-located samples in the first tone-mapped version of the picture and the second version of the picture around the global tone-mapping function exceeding a predetermined threshold, wherein the local predictor is configured to, in case of the suppression, perform the local derivation of, and the application onto the first tone-mapped version of the picture rather than the globally predicted reference picture. Accordingly, a transmission of the global tone-mapping function from encoder to decoder is, in accordance with these embodiments, restricted to pictures where the transmission of the global tone-mapping function and the application thereof is worthwhile, while avoiding the transmission overhead for pictures where the global prediction primarily causes penalties in terms of coding rate to be spent for the transmission of the global tone-mapping function. The suppression decision may be signaled to the decoder.

In accordance with further embodiments of the present application, the local predictor is configured to, in locally deriving the locally varying tone-mapping function, determine for each sub-portion a slope and an intercept of a regression line through a distribution of pairs of values of co-located samples in the respective sub-portion of the second version of the picture and the globally predicted reference picture. In order to efficiently code the slope and the intercept, the slope determined for a current sub-portion may be coded as a prediction residual of a spatial prediction from the slope of a neighboring sub-portion, the slope of which has been previously coded. A straight line having the slope of the current sub-portion is, in accordance with an embodiment, fitted into a distribution of pairs of values of co-located samples in the neighboring sub-portion of the second version of the picture as reconstructed so far on the one hand and the globally predicted reference picture on the other hand, and the intercept of the straight line is determined, wherein the intercept of the respective sub-portion is coded as a prediction residual relative to a spatial intercept prediction which depends on the intercept of the straight line. These embodiments take advantage of the inventors' observation, according to which the local varying slope determined by the local predictor is suitable for, and offers high coding gains from, spatial predictive coding, whereas the intercept correlation between neighboring sub-portions is influenced by the locally varying slope, and accordingly the exploitation of local correlation between neighboring intercept values is firstly rendered possible by performing another straight line fitting using the predicted slope of the current sub-portion as slope for the neighboring sub-portion and use the resulting intercept for spatially predicting the slope of the current sub-portion.

The above mentioned and further advantageous implementations of embodiments of the present invention are the subject of the dependent claims.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
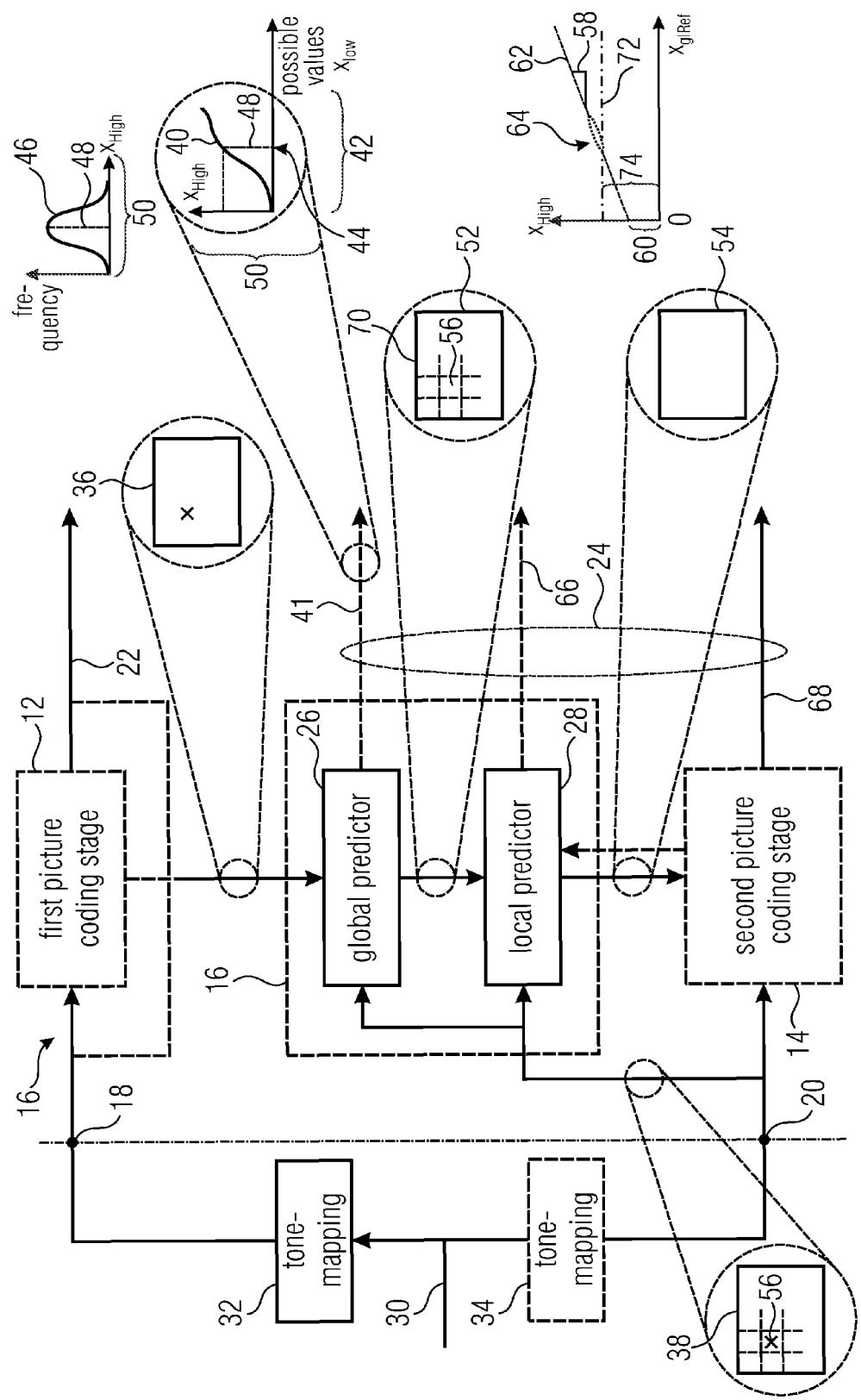
FIG. 1 shows a block diagram of an apparatus for performing inter-layer prediction at an encoding site in accordance with an embodiment.

FIG. 1 shows an embodiment of an apparatus 10 for performing inter-layer prediction between a first picture coding stage 12 for coding a first tone-mapped version of a picture, and a second picture coding stage 14 for coding a second version of the picture. The first tone-mapped version of the picture coded by the first picture coding stage 12 has a first dynamic sample value range. For example, the first picture coding stage 12 operates at integer sample values of bit length m. The second version of the picture coded by the second picture coding stage 14 has a second dynamic sample value range which is greater than the first dynamic sample value range. For example, the second picture coding stage 14 may be configured to operate at integer sample values of bit length n with n>m. In the more detailed embodiment of FIG. 2, n is 12 and m is 8.

FIG. 1 shows the apparatus 10 for performing inter-layer prediction, the first picture coding stage 12 and the second picture coding stage 14 as being connected to each other to form a scalable picture coder 16. The first picture coding stage 12 has an input which is connected to a low dynamic range input 18 of the scalable picture coder 16, and likewise the second picture coding stage 14 has an input which is connected to a high dynamic range input 20 of the scalable picture coder 16. An output of the first picture coding stage 12 is connected to a base-layer data stream output 22 of the scalable picture coder 16, and an output of the second picture coding stage 14 outputs an enhancement data stream to an enhancement data stream output 24 of the scalable picture coder 16. As will get clear from FIG. 2, the outputs do not have to be physically distinct. Rather, both datastreams at outputs 22 and 24 may be multiplexed into in scalable datastream for which the coder 16 would merely have to provide one common output.

The apparatus 10 is connected between the first picture coding stage 12 and the second picture coding stage 14. In particular, as illustrated by dashed lines in FIG. 1, the global predictor 10 could have its input connected to input 18 to receive the original version of the first tone-mapped version of the picture as arriving at the first picture coding stage 12 so as to operate on the first tone-mapped version of the picture without coding loss optionally caused by the first picture coding stage 12. This alternative also equals a connection of the input of apparatus 10 with the output of first picture coding stage 12 in case of the latter being configured to losslessly code the first tone-mapped version of the picture. However, in case of a lossy coding it is advantageous if the apparatus 10 has its input connected to the output of first picture coding stage 12 which is, in turn, connected to output 22, or some other output at which the reconstructible version of the first tone-mapped version of the picture as reconstructible on the basis of the base-layer data stream output at 22 is derivable such as in internal buffer in an internal prediction loop of coding stage 12. This latter reconstructable version of the first tone-mapped picture version is also available at the decoding side on the basis of the base-layer data stream 22 so that the inter-layer prediction further described below may exactly recovered at the decoding side.

Internally, the apparatus for performing the inter-layer prediction comprises a global predictor 26 and a local predictor 28. Global predictor 26 and local predictor 28 are serially connected between the input of apparatus 10 and an output of apparatus 10 at which the apparatus 10 outputs a reference picture to an inter-layer prediction input of second picture coding stage 14. Both global and local predictors 26 and 28 are connected to input 20 where the second version of the picture is provided. Further, both global and local predictors 26 and 28 may generate side information and output this side information to output 24 so as to form side information of the enhancement data stream output by the second picture coding stage 14. As illustrated by FIG. 1 by a dashed line leading from the second picture coding stage to the local predictor 28, local predictor 28 and second picture coding stage 14 may cooperate in an interactive manner as will be outlined in more detail below with respect to more specific embodiments of the apparatus 10 shown in FIG. 1.

FIG. 1 also shows illustratively how the scalable picture coder 16 may be fed with the first and second versions of the picture at inputs 18 and 20. It is emphasized that a different solution would also be feasible. In any case, in accordance with the solution shown in FIG. 1, a high dynamic range picture arrives at a node 30. A tone mapper 32 is connected between this node 30 and input 18 so as to derive the tone-mapped version of the picture from the high dynamic range picture at node 30. As shown by dashed lines in FIG. 1, a further tone mapper 34 may optionally be connected between node 30 and input 20. That is, the second version of the picture coded by the second picture coding stage 14 may be the high dynamic range picture at node 30 itself or may be a tone-mapped version thereof which, however, has a greater dynamic sample value range compared to the version at input 18.

After having described the structure of the apparatus 10 and its integration into the scalable picture coder 16 and the system for coding a picture at node 30 into a base-layer data stream and enhancement data stream, respectively, the mode of operation of apparatus 10 and the other elements shown in FIG. 1 is explained.

As became clear from the above discussion of FIG. 1, it is an aim of the entire system shown in FIG. 1 to encode a picture at node 30 in a scalable manner into a base-layer data stream at output 22 accompanied by an enhancement data stream at output 24 so that a version of the picture having a lower dynamic sample value range is derivable from the base layer data stream and a version of the picture having a greater dynamic sample value range is derivable from the enhancement data stream when having a reconstruction of the lower dynamic sample value range version at hand. To be more precise, in order to lower the data rate that may be used for transmission, the apparatus 10 exploits redundancies between the tone-mapped lower dynamic range version and the second, higher dynamic range version by providing the second picture coding stage 14 with a predicted reference picture for the inbound second, higher dynamic range picture. Accordingly, the second picture coding stage 14 may be configured to merely encode the prediction residual of the predicted reference picture, i.e. the difference between originally arriving higher dynamic range version and interlayer predicted version. For coding the residual, the second picture coding stage 14 may use lossy coding including quantization, including, for example, transform coding such as a block-wise DCT or the like the quantization results of which, i.e. the transform coefficient levels, are coded in the enhancement datastream. The coded residual representing the prediction residual is output by the second picture coding stage 14. Global and local predictors 26 and 28 may accompany this coded residual with the just-mentioned side information enabling global and local predictors at the decoding side to perform inter-layer prediction in the same manner as predictors 26 and 28 at apparatus 10.

As became clear from the discussion in the introductory portion of the specification of the present application, the tone mapper 32 is free to choose the tone-mapping function applied onto picture 30. This means, in particular, that the tone mapper 32 may apply a locally varying tone-mapping function onto the samples of the high dynamic range picture 30. It is important to note that all elements of the scalable picture coder 16 are agnostic with respect to the mode of operation and the actual chosen tone-mapping function of tone mapper 32. In a real scenario, the tone mapper 32 may be controlled by a film maker, for example, who controls the tone-mapping function of tone-mapper 32 so as to achieve a pleasant representation of the high dynamic range picture 30 within the dynamic range bounds of the first picture coding stage 12.

That is, the tone-mapping function applied by tone mapper 32 may vary locally within the picture at node 30. In case of the picture being a picture of a video and the first picture coding stage 12 being, accordingly, a video coder, the tone-mapping function applied by tone mapper 32 may even also vary in time. Even the local/spatial variation of the tone-mapping function locally within the individual pictures of the video may vary in time. For example, the tone mapper 32 may be controlled so as to change the tone-mapping function when switching from one scene of the video to the other, or within a picture so as to change the tone-mapping function between background and foreground or the like. Again, coding stage 12 as well as apparatus 10 are agnostic with respect to these changes.

Likewise, the optional tone mapper 34 is free to apply a spatio or spatio/temporal changing tone-mapping function onto the high dynamic range picture so as to derive the second version of the picture and again, apparatus 10 and coder 14 are agnostic with respect to such changes. Again, an operator may control the tone mapper 34 so as to obtain a pleasant representation of the picture in the dynamic sample range bounds imposed by the coding stage 14.

Later, with respect to FIG. 2, where a more specific implementation of the embodiment of FIG. 1 is shown, it will become clear that the feeding of inputs 18 and 20 may be performed such that coders 12 and 14 operate on different color spaces, i.e. that the versions provided at inputs 18 and 20 have their samples representing the color in different color spaces, respectively. In that case, the inter-layer prediction performed by apparatus 10 may be performed by any of these color spaces or a third color space. Moreover, the inter-layer prediction performed by the global and local predictors 26 and 28 in more detail below may relate to merely the luminance component of the respective color space. A color space transformation may then be used to switch between the different color spaces. However, it should be made clear that all of the embodiments described hereinafter would easily be transferable to embodiments where the pictures are merely defined in grayscale.

After this rather generic introductory description of FIG. 1, the mode of operation of the global predictor 26 and the local predictor 28 is described. Predictors 26 and 28 operate in a two-stage manner. The global predictor 26 seeks to identify a global relationship between sample values of the lower dynamic range version of the picture and the sample values of the higher dynamic range version of the picture and to use this global relationship to perform a first step in determining the reference picture to be used by the coding stage 14 for effectively predictively coding the higher dynamic range version of the picture. In particular, the global predictor 26 is configured to derive a global tone-mapping function based on a statistical analysis of pairs of values of co-located samples in the first tone-mapped version and the second version of the picture, and apply the global tone-mapping function onto the first tone-mapped version of the picture to obtain a globally predicted reference picture for the second version of the picture. To illustrate this, FIG. 1 illustrates the first tone-mapped version of the picture at 36 and the second version of the picture at 38. As both versions 36 and 38 are versions of the same picture, a co-location may be defined between samples of both versions 36 and 38. As described above, the samples of version 36 are defined at a lower dynamic sample value range compared to the samples of version 38. For example, the samples of version 36 are coded using 8 bits whereas samples of version 38 are coded using 12 bits. By small crosses, FIG. 1 illustrates a co-located pair of samples as a representative. The statistical analysis of the pairs of co-located samples in versions 36 and 38 may, for example, involve the formation of a global tone-mapping function defined over the possible values of the low dynamic sample values picture version 36 and having for each possible value a central tendency or mean value of corresponding high dynamic sample values of the picture version 38. To be more precise, the global predictor 26 may be configured to derive a global tone-mapping function 40 by, for each of possible values $x_{low}$ of the first dynamic sample value range 42 of the picture version 36—or at least a subset of representative supporting values among the possible values –, determining a central tendency of a distribution of the values $x_{High}$ of the samples in the second version 38 of the picture, which are co-located to samples in the first tone-mapped version 36 of the picture, the value $x_{low}$ of which equals the respective possible value. In FIG. 1, for example, one possible value is illustratively shown by a dotted line at 44, and the histogram or distribution of the sample values $x_{High}$ of co-located samples in the picture version 38, namely co-located to the samples in the picture version 36 having this representative possible low dynamic range value 44, is shown at 46. As described, the global predictor 26 determines the central tendency of this distribution 46 such as the arithmetic mean 48 and adopts this value 48 as the value of the global tone-mapping function 40 at the representative possible value 44. Accordingly, the global tone-mapping function 40 performs a mapping between the dynamic sample value range 42 of the picture version 36 and the second dynamic sample value range 50 of the picture version 38. In particular, the global tone-mapper 26 obtains the global tone-mapping function 40 by performing the just-mentioned procedure for different possible values $x_{low}$. The global predictor 26 may perform the just-outlined procedure for every possible value. However, in order to keep the computational overhead in a reasonable range, the global predictor 26 may perform the just-outlined procedure merely for supporting points or a proper subset of the possible values rather than for all possible values, with interpolating between these supporting points so as to obtain the global tone-mapping function therebetween.

As shown in FIG. 1, the global predictor 26 may be configured to encode the global tone-mapping function 40 as side information into the enhancement data stream generated by the second picture coding stage 14 and forming an extension of the base-layer data stream output by the first picture coding stage 12.

The application of the global tone-mapping function 40 onto the first tone-mapped version 36 of the picture may involve setting each sample value within picture version 36 to the corresponding global tone-mapping function value, i.e. the mean value to which its low dynamic sample value is mapped according to the global tone-mapping function 40. Accordingly, the globally predicted reference picture thus obtained an output by global predictor 26 has sample values which are already defined in the higher dynamic sample value range of the picture version 38 to be predicted.

Remarkably, the global predictor 26 did not use any knowledge of the tone-mapping performed within the tone mapper 32 or any knowledge of an optionally performed tone-mapping by tone mapper 34.

The global predictor 26 may encode the global tone-mapping function 40 differentially in serial direction of increasing or decreasing possible values $x_{low}$, e.g. coding differences $f(x_{low}=i)-f(x_{low}=i-1)$, $f(x_{low}=i+1)-f(x_{low}=i)$ .... However, other approaches would also be feasible such as firstly approximating function f using curve fitting such as using a Taylor approximation of polynomial degree p>=1 or the like, with then coding the residuals which residual coding may then be conducted using differential coding again.

The local predictor 28 is configured to locally derive a locally varying tone-mapping function based on a statistical analysis of values of co-located samples in the second version 38 of the picture and the globally predicted reference picture 52 in units of sub-portions into which the globally predicted reference picture 52 and the second version 38 of the picture are partitioned, and apply the locally varying tone-mapping function onto the globally predicted reference picture 52 to obtain a globally and locally predicted reference picture 54 for the second version 38 of the picture. For example, the partitioning may a regular partitioning into blocks of equal size and arranged in columns and rows, as illustrated in FIG. 1 by dashed lines, or may be some other partitioning of picture version 38 and globally predicted reference picture 52 into sub-portions with co-located boarders at which the sub-portions abut each other. The local predictor 28 may, in locally deriving the locally varying tone-mapping function, determine for each sub-portion 56 a slope 58 and an intercept 60 of a regression line 62 through a distribution 64 of pairs of values of co-located samples in the respective sub-portion 56 of the picture version 38 and the globally predicted reference picture 52, i.e. distribution of points ($x_{High}(i)$, $x_{glRef}(i)$) with i denoting sample positions within the current sub-portion 56. In FIG. 1, the sample values of samples within reference picture 52 are denoted $x_{glRef}$, while the sample values of picture version 38 are denoted $x_{high}$. In the more specific embodiment outlined in more detail below, the slope is denoted ω and the intercept as o. Both values define, for each sub-portion 56, the local varying tone-mapping function at that very sub-portion 56. In even other words, the local predictor 28 determines for each sub-portion 56 a pair of slope 58 and intercept 60, which values are encoded as side information into the enhancement data stream at output 24 as indicated by dashed arrow 66.

As will be described in more detail below, the local predictor 28 may be configured to quantize the slope 58 and the intercept 60 by minimizing a cost function which depends on the respective sub-portion 56 of the high dynamic range picture version 38 and the respective sub-portion 56 of the globally predicted reference picture 52 having its samples weighted by the slope and shifted by the intercept 60. That is, the quantized slope 58 and the quantized intercept 60 are dedicated for obtaining the finally predicted reference picture 54 in the following manner: the sample values $x_{glRef}$ within a sub-portion 56 of reference picture 52 are weighted (multiplied) by ω and o is added to the resulting product, i.e. $x_{lo+glRef}(i)=x_{glRef}(i)\omega+o$ for all sample positions i within sub-portion 56. This is done for each sub-portion 56 using the corresponding pair of quantized ω and o.

As will be described with respect to the more detailed embodiment described below with respect to FIG. 2, the local predictor 28 may be configured to quantize the slope 58 and the intercept 60 by minimizing a cost function which monotonically increases with a data rate needed by, and monotonically increases with a distortion caused by, the second picture coding stage 14 for coding a deviation between the respective sub-portion 56 of the second version 38 of the picture on the one hand and the respective sub-portion 56 of the globally predicted reference picture 52 having its samples weighted by the slope 58 and shifted by the intercept 60 as just described, on the other hand. By this manner, the actually chosen pair of (quantized) slope 58 and intercept 60 optimizes the wanted cost function rather than minimizing the deviation of the points of value pairs of the distribution 64 from the regression line 62, which deviation does not as closely correlate to this cost function. The quantized values may be denoted as $\hat{\omega}$ and $\hat{o}$ to distinguish them from the first trial resulting from the regression 62, but this differentiation will be neglected preliminarily.

Thus, finally, at the output of local predictor 28, the globally and locally predicted reference picture 54 is provided which differs from the globally predicted reference picture 52 in that, within each sub-portion 56, each sample value of reference picture 52 has been weighted by the corresponding slope value 58 of the respective sub-portion with adding o to the product resulting therefrom. The second picture coding stage 14 may use this reference picture 54 for performing inter-layer prediction. In particular, the second picture coding stage 14 may code a prediction residual between the globally and locally predicted reference picture 54 and the picture version 38 into the enhancement data stream, i.e. $x_{High}(i)-x_{lo+glRef}(i)$ for co-located sample positions i, and may use, to this end, transform coding, for example. However, it should be noted that the second picture coding stage 14 may also admit other prediction modes than the inter-layer prediction mode just described. That is, for forming the prediction residual 68 output at its output for representing the picture version 38, the second picture coding stage 14 may assign a prediction mode to each of the partitions of picture version 38, one of which encompasses predicting the current partition based on the co-located partition of reference picture 54. Other prediction modes may determine the prediction residual based on other reference pictures such as by temporally predicting the respective partition from previously coded pictures of the video inbound at input 20. The partitioning with regard to the latter partitions may be equal to or may differ from the partitioning defining the sub-portions 56.

As became clear from the description above, the mode of operation of the stage 14 may involve the coding of the prediction residual 68, and this coding may be lossy, i.e. may involve a quantization such as a quantization of the transform coefficients resulting from transforming the prediction residual. Accordingly, at the decoding side the original version of picture version 38 may not be available. To be more precise, the reconstructible version of picture version 38 may differ from the original version entering at input 20 by way of the just mentioned quantization involved in forming the prediction residual 68. Coding stage 14 may provide the local predictor 28 with a reconstructible version of picture version 38 for an efficient encoding of side information 66, as will be discussed in more detail below and briefly outlined now. The sample values of the reconstructible version of picture version 38 may be denoted $\hat{x}_{High}$—rather than the not quantized values $x_{High}$.

In particular, the local predictor 28 may be configured to encode the slope 58 determined for a certain sub-portion 56 as a prediction residual of a local prediction from the slope w of a neighboring sub-portion such as sub-portion 70, the slope w of which has been previously encoded. For example, the local predictor 28 may use a raster scan order in order to sequentially encode the sub-portion's slope and intercept values o and w row by row from a top of the picture to the bottom. Within each row, the scan order may lead from left to right. Accordingly, the top and left-hand sub-portions may serve as the neighboring sub-portions 70, the slope values of which may serve for locally predicting the current sub-portion's slope value such as by combining same using a mean thereof or the like.

Unfortunately, the intercept values o are very much dependent on the slope values and accordingly a detour is used by local predictor 28 in order to derive a predictor for the intercept 60 of a current sub-portion 56. In particular, the local predictor 28 fits a straight line 72 having the slope of the current sub-portion 56 into a distribution of pairs of values of co-located samples in the neighboring sub-portion 70 of picture version 38—as reconstructible based on the prediction residual 68 —, i.e. $\hat{x}_{High}(i)$ with i denoting the samples contained in the neighboring sub-portion, and the globally predicted reference picture 52, i.e. $x_{glRef}(i)$ with i denoting the samples contained in the neighboring sub-portion, and determines the intercept of this straight line 72, i.e. 74. Based on this intercept 74, the local predictor 28 locally predicts the intercept 60 of the current sub-portion 56 and encodes the prediction residual to represent the current sub-portion's intercept value o. As the local predictor at the decoding side has to do the same, the local predictor 28 uses a different distribution of points into which the straight line 72 is fit, namely the distribution of points ($\hat{x}_{High}$(i), $x_{glRef}$(i)) with i denoting the samples contained in the neighboring sub-portion. In particular, the prediction residual 68 as lossy coded, plus the reference picture 54, within the current sup-portion 56, i.e. $\hat{x}_{High}$(i)=$x_{lo+glRef}$(i)+residual(i) with i denoting the samples contained in the neighboring sub-portion and residual(i) being derivable from residual signal 68, is used instead of the original version of picture version 38 within the current sub-portion 56, i.e. instead of $x_{High}$(i).

As will become clear from the description brought forward below, the global predictor 26 may be configured to suppress the application of the global tone-mapping function 40 in case of a scattering of the pairs of the values of the co-located samples in the first tone-mapped version 36 of the picture and the second version 38 of the picture, i.e. the points ($x_{High}$(i), $x_{Low}$(i)) for all i sample positions i in the picture, around the global tone-mapping function 40, i.e. f(j) with j assuming all possible values of $x_{Low}$, exceeding a predetermined threshold. To be more precise, the distributions 46 around the mean values 48 for each possible value 44 form a corridor around the global tone-mapping function 40 within which the sample values of picture version 38 are distributed, and if this corridor is too broad, the global predictor 26 may suppress the application of the global tone-mapping function 40. As a measure for the scattering or broadness of the just-mentioned corridor, the sum of variances of distributions 46 at the different possible values may be used. The local predictor 28 may be configured to, in case of the suppression, i.e. in case of the just-mentioned scattering exceeding the predetermined threshold, perform the local derivation and the application of the local varying tone-mapping function on the first tone-mapping version 36 of the picture rather than the globally predicted reference picture 52.

The global predictor 26 may signal the suppression within the side information to the decoding side. In other words, for a picture for which the suppression of the global prediction is used, the suppression is signaled and no global tone-mapping function 40 has to be transmitted as side information within the enhancement data stream at output 24.

Figure 2:
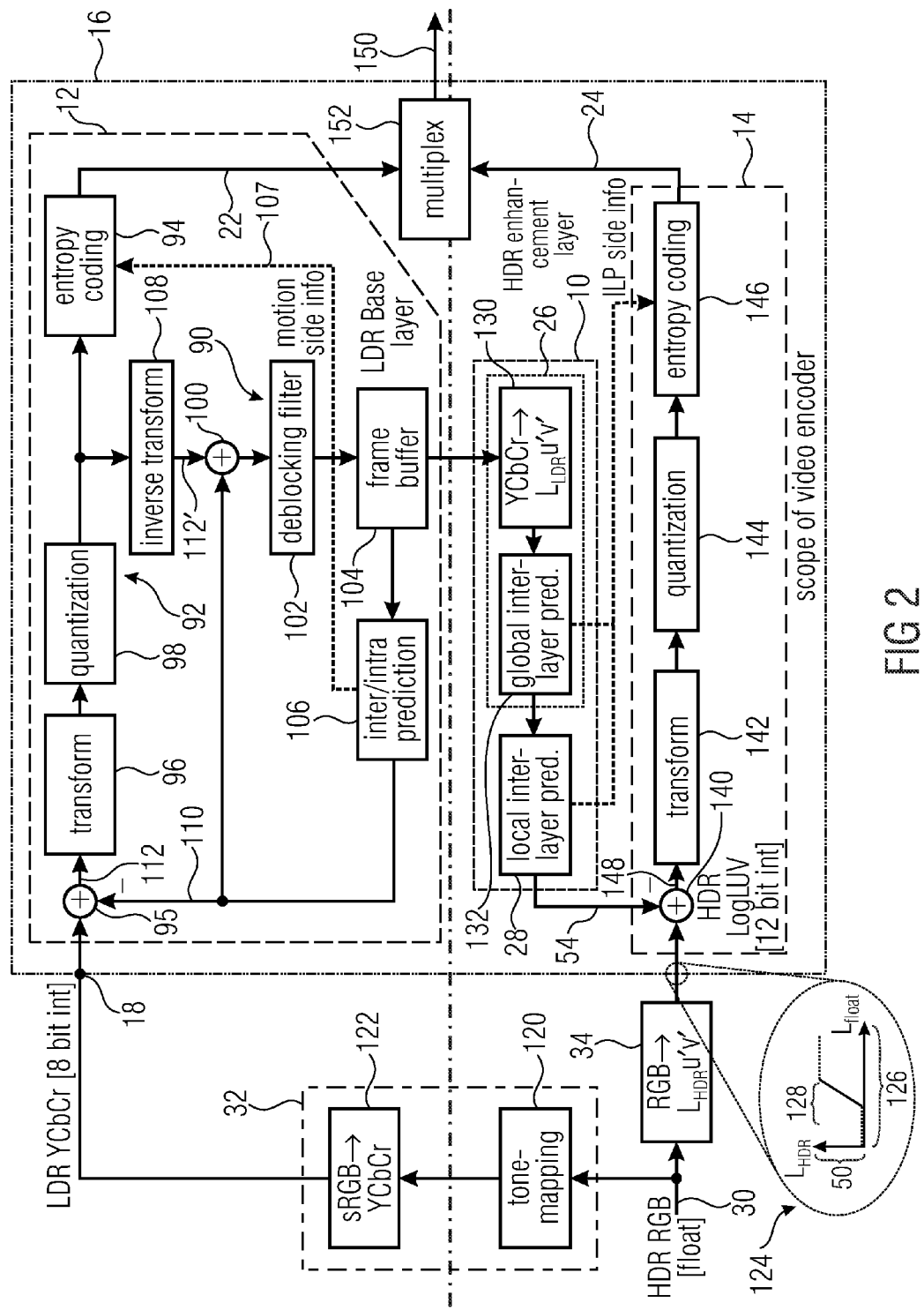
FIG. 2 shows a block diagram of a possible implementation of the embodiment of FIG. 1.

Before describing an embodiment for an apparatus for performing inter-layer prediction at the decoding side which fits the apparatus of FIG. 1, a more detailed embodiment of the apparatus of FIG. 1 is described with respect to FIG. 2.

In accordance with FIG. 2, a high dynamic range video is coded and accordingly coding stage 12 is a video coder. In particular, a hybrid video coder is used which, in the very example presented here, is H.264 conform. However, this is not mandatory. Moreover, the following discussion will show that it is possible to interleave the data streams at outputs 22 and 24 into one common data stream, but this is naturally also not necessary. Generally, in describing the embodiment of FIG. 2, the same reference signs as used in FIG. 1 have been adopted to avoid a repetitive description of the functionality of the elements occurring in both figures. Insofar, the embodiment of FIG. 2 shall also be interpreted as showing possibilities for specifically implementing elements of FIG. 1 and all of these possibilities shall be interpreted as being individually applicable to the individual elements of FIG. 1.

First of all, the structural details compared to FIG. 1 are described. For example, FIG. 2 shows a possible implementation of the coding stage 12 as a hybrid video coder comprising a prediction loop 90 supporting spatial and temporal prediction modes for blocks of inbound pictures, and a lossy residual transform coder 92 followed by an entropy coder 94. In particular, the hybrid video coder 12 of FIG. 2 comprises a subtractor 95, a transformer 96 and a quantization stage 98, which are connected between an input of the hybrid video coder 12 and an output thereof in the order of their mentioning, along with entropy coder 94, wherein transformer 96 and quantization stage 98 form together the lossy residual transformer 92. The prediction loop comprises an adder 100, a deblocking filter 102, a frame buffer 104 and an inter/intra prediction module 106, which are serially connected to each other in a loop so that the output of the prediction module 106 is connected to a first input of adder 100. A second input thereof is connected via an inverse transformer 108 to the output of quantization stage 98. The output of prediction module 106 is also connected to the subtracting input of subtractor 95. Prediction parameters determined by prediction module 106, such as motion prediction data and the like are also fed, as shown by dashed line 108, to entropy coder 94.

Accordingly, in operation, subtractor 95 subtracts a prediction signal 110 from a current picture entering video coder 12 at a non-inverting input of subtractor 95, thereby yielding a residual signal 112 at the output of subtractor 95. Transformer 96 then spectrally decomposes this residual signal 112 by block-wise transform and quantization stage 98 quantizes the transform coefficients thus obtained, thereby introducing the coding loss. While the inverse transformer 108 reveals the residual signal also reconstructible at the decoding side, the entropy coder 94 losslessly codes, using entropy coding, the residual signal into the base-layer data stream 22 along with the prediction parameters 107 just mentioned, i.e. the chosen prediction modes, motion parameters for temporally predicted blocks and intra prediction parameters for intra predicted blocks. At the output of adder 100, which adds the reconstructed residual signal 112' at the output of inverse transformer 108 and the prediction signal 110 output by prediction module 106, the reconstructed picture results which is optionally subject to in-loop filtering by the optional deblocking filter 102, whereupon the reconstructed picture is stored in the frame buffer 104. The prediction module 106 is able to use the reconstructed pictures stored in the frame 104 for performing temporal prediction for inter-prediction blocks of a subsequently coded picture. At the decoding side, the base layer decoder comprises an equivalent prediction loop which exactly recovers the same reconstructed pictures by applying the prediction parameters onto the residual signal sent via the base layer signal 22.

As shown in FIG. 2, the hybrid coder 12 may operate on 8 bit luma sample values representing a luma component of an YCbCr color space. Accordingly, the reference pictures stored in the frame buffer 104 are composed of luma samples of the same bit length, i.e. 8 bits.

In accordance with the specific example of FIG. 2, the high dynamic range video may have been provided at node 30 in an RGB color space format using floating numbers indicating the individual color components per sample. The tone mapper 32 of FIG. 2 is exemplarily shown to be split into two consecutive processes, namely the actually shown mapping 120 followed by a color conversion 122. However, the order among the processes may alternatively be switched. While the color conversion process 122 represents a dynamic range conserving transition from the initial color space of the high dynamic range video at node 30, i.e. RGB, to the color space of the video coder 12, i.e. YCbCr, the tone-mapping 120 applies the above mentioned spatio-temporally varying tone-mapping function onto the samples of the video at node 30, thereby reducing the dynamic range down from the initial one to the dynamic range of the 8 bit wide sample representation of the video coder 12.

In accordance with the embodiment of FIG. 2, a tone mapper 34 is present which transitions from the HDR floating point representation at node 30 to an integer 12 bit wide luma representation of coder 14. In particular, in order to exploit the representable dynamic range, an Log Luv representation or color space is used where the luma or luminance component is represented by 12 bit wide integer values, the interval of possible values of which regularly sample a sub-interval of the logarithm-of-luminance domain. In other words, the tone mapper 34 of FIG. 2 performs two functions, namely a transition from one color space to the other, namely from RGB to Luv with a component L indicating the logarithm of the luminance, and spatio/temporally varying the sub-interval mapped by the tone mapper 34 onto the sample value range of the luma samples fed to coder 14. See, for example, the graph shown at 124 in FIG. 2. The representation interval of the logarithm of the luminance representable by the high dynamic range samples is indicated at 126. In other words, the interval 126 is covered when turning all possible floating point states of the color representation of the high dynamic range video at node 30 into luminance values and taking the logarithm therefrom. The tone mapper 34, in performing the tone-mapping, spatially and temporally varies the sub-interval 128 which is linearly mapped onto the integer representation or dynamic range 50 of the luma samples of the video fed into the coding stage 14, that is the width of interval 128 as well as the position thereof along axis $L_{float}$.

Accordingly, FIG. 2 also shows a global predictor 26 as comprising two functions, namely a color space conversion 130 for transitioning from the color space of coder 12, i.e. YCbCr, to the Luv color space, followed by the actual global tone-mapping 132, which is globally applied to the samples of a current picture out of the frame buffer 104 of coder 12. For example, the luminance values of the color space at the output of color space conversion 130 may still have the lower bit length of coder 12, i.e. 8 bits, for example, whereas at the output of global inter-layer prediction 132 the reference picture has 12 bits as outlined above with respect to FIG. 1 and as will be described again in more detail below.

Internally, coding stage 14 comprises a concatenation of a subtractor 140, a transformer 142, a quantizer 144 and an entropy coder 146. Color space converter 130, global tone-mapper 132 and local predictor 28 are serially connected between frame buffer 104 and the inverting input of subtractor 140 and form the inter-layer apparatus in the sense of FIG. 1. Accordingly, subtractor 140 subtracts the reference picture 54 output by local predictor 28 from the currently coded picture inbound from tone mapper 34 to obtain a prediction residual 148 which is then lossy transform coded by transformer 142 which performs a spectral decomposition such as a block-wise transformation such as a DCT followed by a quantization of the transform coefficients in quantizer 144 and a lossless entropy coding of the quantization levels of the transform coefficients by entropy coder 146, thereby yielding the prediction residual 68. As shown by "ILP side info" the side information generated by global and local predictors 26 and 28 is also fed into the entropy coder 146 for forming the enhancement data stream 24.

Both data streams, base-layer data stream 22 and enhancement data stream 24, are multiplexed in accordance with the embodiment of FIG. 2 into a common data stream 150 by way of a multiplexer 152, which multiplexing is however optional.

Before proceeding with describing an apparatus for performing the inter-layer prediction at the decoding side which fits to the above outlined embodiments, several notes are made on possible generalizations of the above description.

For example, although the above outlined embodiments described that the global and local prediction of the inter-layer prediction is performed in a domain where the integer values of the samples of the first tone-mapped version 36 and the second version 38 of the picture relate to co-domains of linear functions of sub-intervals out of the logarithm luminance domain, the above embodiments are not restricted to this embodiment. Rather, another luminance domain may also be used. Moreover, the above embodiments are not restricted to perform the inter-layer prediction described above to the luminance component. Rather, the above embodiments may also be applied to other color components.

Moreover, although the specific embodiment of FIG. 2 specifically used an 8 bit wide representation for the samples of the pictures coded by coder 12 and a 12 bit wide representation for the samples of coder 14, integers having other bit lengths may also be used as long as the bit length n used by coder 14 is greater than the bit length m used by coder 12.

As far as coding stage 14 is concerned, it is noted that same is not restricted to using transform coding to encode the prediction residual. Rather, same may encode the prediction residual directly in the spatial domain. Moreover, same may losslessly code the prediction residual in accordance with an alternative embodiment. As far as the entropy coders are concerned, same are not restricted to any kind of entropy coding such as arithmetic or variable length coding. Rather, same lossless coders may be implemented using another type of lossless compression technique.

In more specific words, FIG. 2 shows a block diagram of the architecture of a scalable HDR video codec (HDR SVC). The upper part 12 constitutes the LDR base layer. It is fed with a tone-mapped raw video sequence in YCbCr 4:2:0 color space (cf. tone-mapping, sRGB→YCbCr in FIG. 2). The base layer is an unmodified SVC base layer encoder (8 bit/component) and thus compatible with the H.264/AVC standard.

For feeding the enhancement layer encoder stage 14 the original floating point HDR video data at node 30 is represented by integer numbers with limited precision. This color space shall be capable to represent a high dynamic range and the full color gamut with errors below the perception threshold. The Lu'v' color space with a bit depth of 12 bit for luma and 8 bit for chroma components (cf. RGB→$L_{HDR}$u'v' in FIG. 2) is considered here. Sampling is 4:2:0 as for the LDR base layer 12. In accordance with the above description, the HDR enhancement layer coder 14 may operate at 12 bit without using motion compensated prediction, but the use of motion compensated prediction may naturally be combined with the inter-layer description shown.

In order to reduce redundancy, the HDR enhancement layer video entering coder 14 is predicted by the apparatus 10 from the LDR base layer 12 by an inter-layer prediction (ILP) mechanism. As described above, the task of the ILP 10 is to reduce the costs for transmitting the HDR enhancement layer 24. The ILP solution incorporates, as described, global and local mechanisms. Before ILP can take place, the LDR color space is converted to the HDR color space in 130 such that their luma differences can be calculated in a perceptually meaningful way (cf. YCbCr→$L_{LDR}$u'v' in FIG. 2). It is worth noting again that the ILP 10 is not aware of the specific TMO and thus it constructed to be very flexible.
HDR RGB to Luv A modified version of the Lu'v' color space, originally proposed by Larson [8], is used for the representation of floating point HDR pixel values at node 30 with integer numbers in coder 14. First, the RGB color space is transformed in the tone mapper 34 to CIE(u', v'):

$$\begin{pmatrix} X \\ Y \\ Z \end{pmatrix} = \underbrace{\begin{pmatrix} 0,4124 & 0,3576 & 0,1805 \\ 0,2126 & 0,7152 & 0,0722 \\ 0,0193 & 0,1192 & 0,9505 \end{pmatrix}}_{RGB2XYZ} \cdot \begin{pmatrix} R \\ G \\ B \end{pmatrix} \quad (1)$$

$$Y = Y \quad (2)$$

$$u'_{HDR} = \frac{4X}{X + 15Y + 3Z} \quad (3)$$

$$v'_{HDR} = \frac{9X}{X + 15Y + 3Z} \quad (4)$$

In contrast to [8], an adaptive logarithmic mapping is then used by maper 34 for the luminance to luma transform [c.p. 7]:

$$L_{HDR} = \left\lfloor \frac{2^{12} - 1}{\log_2(Y_{max}/Y_{min})} (\log_2(Y) - \log_2(Y_{min})) \right\rfloor. \quad (5)$$

It allows for representing the frame-wise dynamic luminance range $Y_{max}/Y_{min}$ with 12 bits.
YCbCr to Luv For the inter-layer prediction ILP 10, the base layer color space needs to be matched with the enhancement layer color space in block 130 (cf. YCbCr Lu'v' in FIG. 2).

By multiplying RGB2XYZ from (1) with the inverse of the standard RGB to YCbCr conversion matrix, RGB2YCbCr [9], we can find a transform matrix from YCbCr to XYZ $$\begin{pmatrix} X \\ Y \\ Z \end{pmatrix} = \underbrace{\begin{pmatrix} 0.9505 & 0.2679 & 0.4821 \\ 1.0000 & 0.0000 & 0.0000 \\ 1.0890 & 1.7414 & -0.0253 \end{pmatrix}}_{YCbCr2XYZ} \cdot \begin{pmatrix} Y \\ C_b \\ C_r \end{pmatrix}. \quad (6)$$

We substitute the coefficients of the first and last row in this matrix by a, b, c and d, e, f, respectively and plug X and Z into (3) and (4). This yields:

$$u'_{LDR} = \frac{4aY + 4bC_b + 4cC_r}{(15 + a + 3d)Y + (b + 3e)C_b + (c + 3f)C_r} \quad (7)$$

and $$v'_{LDR} = \frac{9Y}{(15 + a + 3d)Y + (b + 3e)C_b + (c + 3f)C_r}. \quad (8)$$

Finally, a logarithmic mapping is applied to the Y component $$L_{LDR} = \lfloor 255/8 \cdot \log_2(Y+1) + 0.5 \rfloor. \quad (9)$$

Block 130 applies (7) to (9) onto the samples of the reference pictures obtained from the buffer 104 and outputs the result to block 132.

Thus, $L_{LDR}$ and $L_{HDR}$ exhibit the same luminance-luma relationship, namely here exemplarily a logarithmic one, so that any error measure between the two layers during ILP becomes (perceptually) meaningful.
Inter-Layer Prediction Since usually tone-mapping has not much impact on the chromacities, the unmodified values of $u_{LDR}',v_{LDR}'$ may be used to predict $u_{HDR}', v_{HDR}'$. However, for the luma components the relation is more complex. Consequently, it is proposed to use a joint global and local ILP mechanism 132 to reduce the redundancy between the LDR and the HDR video layer, independently of the used forward TMO.
Global Inter-Layer Prediction In the framework of FIG. 2 the global ILP 132 is realized by finding a suitable lookup table for each frame that maps the 256 possible values of $L_{LDR}$ to an adequate value in the HDR domain. Of course, for every $L_{LDR}$ pixel value, there can be many different $L_{HDR}$ values present. Therefore, the arithmetic mean is exemplarily used of all $L_{HDR}$ values that fall into one $L_{LDR}$ bin as reconstruction value in the lookup table g(l) which is, thus, an instantiation of function 40 in FIG. 1:

$$g(l) = \frac{1}{|A_l|} \sum_{i \in A_l} L_{HDR}(i) \text{ where } A_l = \{i = 1 \ldots N \mid L_{LDR}(i) = l\}, \quad (10)$$

with l=0 . . . 255 denoting the index of the bins and $|A_l|$ the cardinality of set $A_l$ of pixels that fall into that bin [2].

Figure 3A:
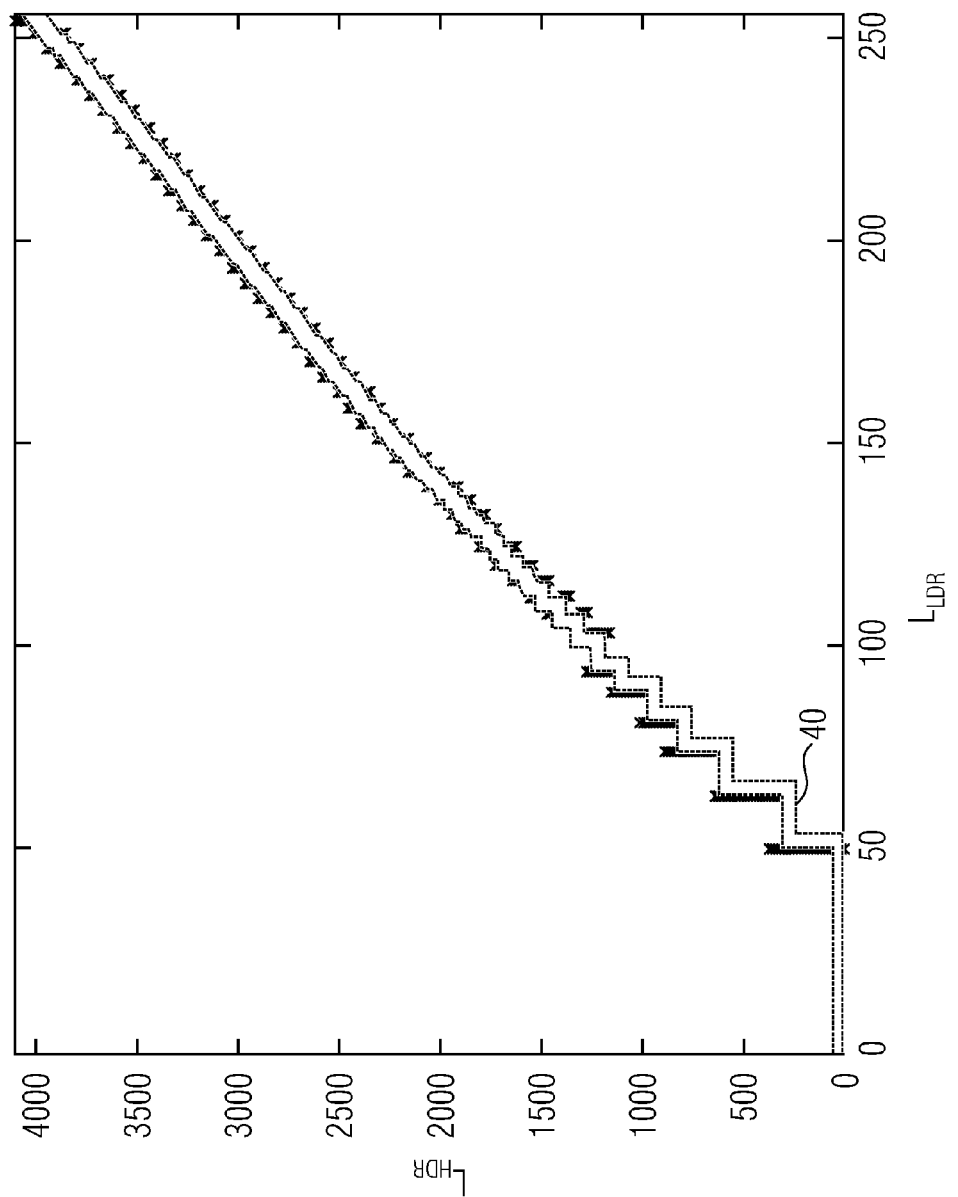
FIGS. 3a and 3b show resulting global tone-mapping functions of FIG. 1 for different tone-mappings applied to derive the low dynamic range picture.
Figure 3B:
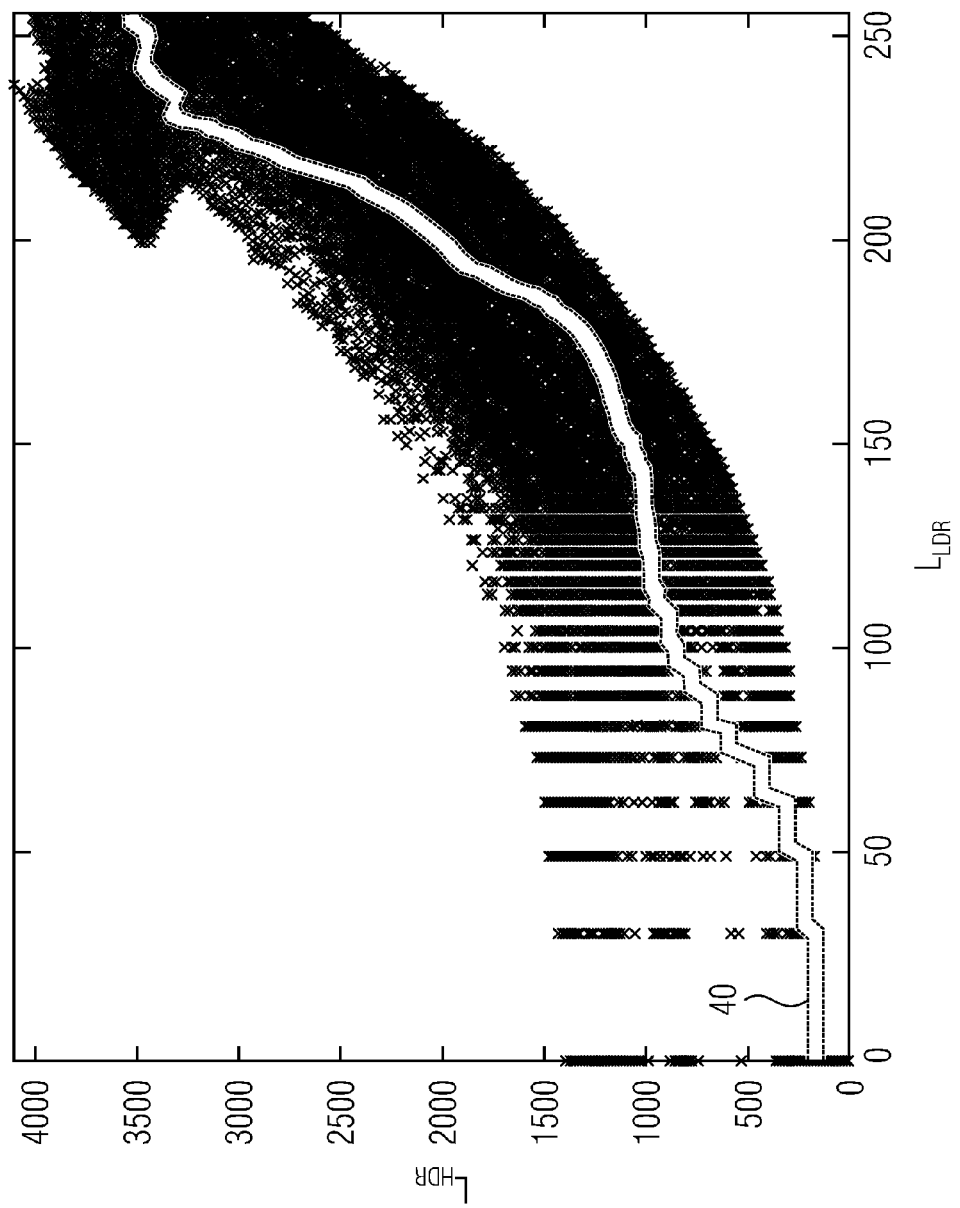

FIG. 3 shows the relation of $L_{LDR}$ and $L_{HDR}$ values and the resulting ILP mapping function 40 for two different TMOs 120 [10] for one frame of a test sequence. In particular, the relation between $L_{LDR}$ and $L_{HDR}$ pixel values for two different TMOs (scattered crosses) is shown: FIG. 3a shows TMO pattanaik00, FIG. 3b shows TMO fattal02 [10]. The estimated global ILP mapping function is shown with a continuous line. Whereas there is a strong correlation between the LDR and HDR values for the pattanaik00 TMO which FIG. 3a refers to, this is not the case for the more locally adaptive fattal02 TMO which FIG. 3b refers to. In the latter case the shown ILP mapping function 40 will not lead to a good compression performance. It can even decrease the performance of the local ILP step 28 described in relation to FIG. 2 in the next section. Therefore, in the framework of FIG. 2, the global ILP mechanism 132 is switched off, when, for example, the mean of the variances of the pixels over all bins exceeds a threshold. The threshold is not a critical value and should be high. The maximally possible standard deviation of 12 bit values ($2^{11}$) may be used, for example.

Since the luminance to luma mapping in mapper 34 of the HDR layer (5) is frame-wise adaptive, the global ILP 132 should operate also frame-wise, in contrast to, e.g., [4]. Therefore, in a separate ITMO mapping function g(l) can be transmitted in each picture, such as in each H.264/AVC picture parameter set, for example. Since usually the function is smooth, it does not consume many bits when it is differentially encoded.
Local Inter-Layer Prediction The macro block (MB)-wise ILP applied in 28 and described hereinafter in relation to FIG. 2, perform using an R-D optimized parameter estimation and uses a color space suitable to represent large dynamic ranges. Moreover, a method is introduced to efficiently predict the ILP parameters of each MB from its causal neighborhood and thus reduce the useful side information significantly. Accordingly, here, the macroblocks known from H.264 serve as representatives of the sub-blocks 56 mentioned with respect with FIG. 1.

Scale and Offset Estimation

The MB-wise ILP in block 28 is based on a linear model for a good trade-off between complexity, useful side information, and prediction efficiency. In order to better understand the following mathematical explanation, the reference signs if FIG. 1 are co-used and insofar the following description is also a possible way of implementing 28 of FIG. 1.

In the following, we denote the vector containing the pixels within an MB 56 in the LDR layer luma space ($L_{LDR}$ or $x_{glRef}$) with l. The vector of the co-located MB 56 in the enhancement layer luma space $L_{HDR}$ (or $x_{high}$) is denoted with h. The predictor h(k) that predicts the HDR k-th pixel h(k) of an MB in the HDR picture 36 is generated from the color converted LDR base layer pixel l(k) in the globally predicted reference picture 52 (or, in case of suppression, in picture 36) according to $$\hat{h}(k)=w \cdot l(k)+o, \quad (11)$$

with scale w and offset o. Only the prediction error $r=h-\hat{h}$ needs to be maintained for the enhancement HDR layer coder 14 which, in turn, ancodes the latter into the residual information 68.

For the fast R-D optimized estimation of w and o, a two stage search method is used. First, an initial guess is derived by simple linear regression, that is $$w = \frac{\overline{lh} - \overline{l} \cdot \overline{h}}{\overline{l^2} - \overline{l}^2}, \quad (12)$$

$$o = \overline{h} - w\overline{l}. \quad (13)$$

The horizontal bar denotes the sample mean value of the respective variable, e.g., $$\overline{lh} = \frac{1}{N} \sum_{k=1}^{N} l(k)h(k).$$

w and o are the inter-layer prediction parameters yielding the prediction error with the smallest energy, that is, the mean squared error (MSE) between $\hat{h}$ and h is minimized w and o define the regression line 62 shown in FIG. 1.

Of course, w and o cannot be conveyed to the decoder with arbitrary precision, but they may be quantized to integer numbers. Accordingly, a quantization interval of 0.5 may, for example, be used for w:

$$\tilde{w} = \left\lfloor \frac{w}{0.5} + 0.5 \right\rfloor. \quad (14)$$

Eq. (13) is modified according to $$\tilde{o} = \lfloor \overline{h} - 0.5 \cdot \tilde{w}\overline{l} + 0.5 \rfloor. \quad (15)$$

Even if we would use the least squares solution of (12) and (13) instead of the rounded versions $\tilde{w}$ and $\tilde{o}$ according to (14) and (15), the minimization of the energy in the residual data does not necessarily result into the highest compression efficiency. Thus, we are interested in finding the model parameters $\hat{w}$ and $\hat{o}$ in an R-D optimal sense.

Starting with the initial guesses for scale $\tilde{w}$ and offset $\tilde{o}$, local predictor 28 scans all scaling factor candidates within a range of $\tilde{w}-6 < \hat{w}_{cand,i} < \tilde{w}+6$. For each scaling parameter candidate $\hat{w}_{cand,i}$ a new starting point for the offset parameter $\tilde{o}$ is calculated according to (15) and the neighborhood in the range $\tilde{o}-6 < \hat{o}_{cand,j} < \tilde{o}+6$ is scanned. For each parameter pair, the MB R-D costs $J_{i,j}$ are then calculated according to the conventional H.264/AVC cost function $$J_{i,j}=D_{i,j}+\lambda R_{i,j}, \quad (16)$$

where $D_{i,j}$ is the MSE and $R_{i,j}$ the bit rate for the respective block when coded with the model parameters $\hat{w}_{cand,i}$ and $\hat{o}_{cand,j}$. The parameters yielding the lowest R-D costs are selected by local predictor 28 as final model parameters $\hat{w}$ and $\hat{o}$.

Coding of Scale and Offset Parameters

Of course, the direct transmission of $\hat{w}$ and $\hat{o}$ for each MB would lead to a considerable bit rate for this side information. Accordingly, it is exploited that predicting the parameters of the current MB 56 from its causal neighborhood 70 (such as MB to the left, and MB above) can reduce the bit rate significantly. In particular, the experiments conducted revealed that the scale parameter $\hat{w}$ changes smoothly enough so as to offer coding gain by using spatial prediction. Thus, the locel predictor 28 calculates a scale parameter predictor $\hat{w}_p$ from the already encoded scale parameters of the upper and left MB, $\hat{w}_u$ and $\hat{w}_l$, respectively. Only the residual $\hat{w}_r$, which is mostly zero or close to zero, has to be coded by the entropy encoder:

$$\hat{w}_r = \hat{w} - \hat{w}_p = \hat{w} - 0.5 \cdot (\hat{w}_u + \hat{w}_l). \quad (17)$$

Unfortunately, the same prediction mechanism will fail for the encoding offset parameter $\hat{o}$, because every small variation of $\hat{w}$ can result in a very large variation of $\hat{o}$. Thus, the smoothness condition is not satisfied for $\hat{o}$. Recalling the relation of scale and offset given by linear regression in (13), locel predictor 28, however, first calculates the offset values of the upper and left MB ($\check{o}_u, \check{o}_l$) as if they had the same scale factor as the current MB ($\hat{w}$):

$$\check{o}_u = \overline{h}_u - \hat{w} \cdot \overline{l}_u \text{ and } \check{o}_l = \overline{h}_l - \hat{w} \cdot \overline{l}_l, \quad (18)$$

with $\overline{h}$ and $\overline{l}$ denoting the mean pixel value of the coded co-located HDR or LDR MB, that can be easily maintained from the corresponding DC value. This simple operation yields $\check{o}_u$ and $\check{o}_l$ values that are usually very close to the offset value of the current MB, $\hat{o}$. Thus the encoded residual offset value $$\hat{o}_r = \hat{o} - \hat{o}_p = \hat{o} - 0.5 \cdot (\check{o}_u + \check{o}_l) \quad (19)$$

is mostly zero or close to zero and thus the useful bit rate becomes neglectable.

Experimental Results

Experiments have been conducted. In performing the experiments, modified the SVC reference software (JSVM8.12) has been modified such that it can support the ILP mechanisms introduced in the previous sections. Coding experiments have been performed with three HDR test sequences: Panorama, Tunnel, and Sun (640×480 pixel, 30 fps). The Panorama test sequence was generated by panning a 8000×4000 pixel HDR panorama image [11]. Its overall dynamic range is of the order of $10^{10}$:1. Both, Tunnel and Sun are freely available from Max-Planck Institute [12]. The overall dynamic range represented in these sequences is $10^5$:1 and $10^1$:1, respectively. Two metrics are used to evaluate the quality of the decoded HDR videos: the HDR visible difference predictor (VDP) [13] and the perceptually uniform peak signal-to-noise ratio (PU PSNR) [14]. The tone-mapped LDR layer sequences have been generated by six different commonly used TMOs that are all part of the pfstmo software package [10]. The following labels in pfstmo are denoted by the TMO number in brackets in our experiments: durand02 (TMO 1), pattanaik00 (TMO 2), fattal02 (TMO 3), mantiuk06 (TMO 4), reinhard02 (TMO 5), drago03 (TMO 6). All operators have been used with their default parameters, but the locally adaptive version of reinhard02 has been used.

The coding results show the quality of the HDR enhancement layer indicated above as being output at 24, w.r.t. the rate of both, the enhancement layer together with the embedded base layer bit stream, i.e. the data rate at outputs 22 and 24 together. The LDR base layer can be simply extracted from this bit stream. Due to lack of space the base layer coding results are not shown here. Fixed QP encoding with equivalent QPs for LDR and HDR layer has been used so that approximately equal quality for both layers could be assumed. Of course, optimal bit allocation is an important issue in SVC, but it goes far beyond the scope of this presentation.

Figure 4A:
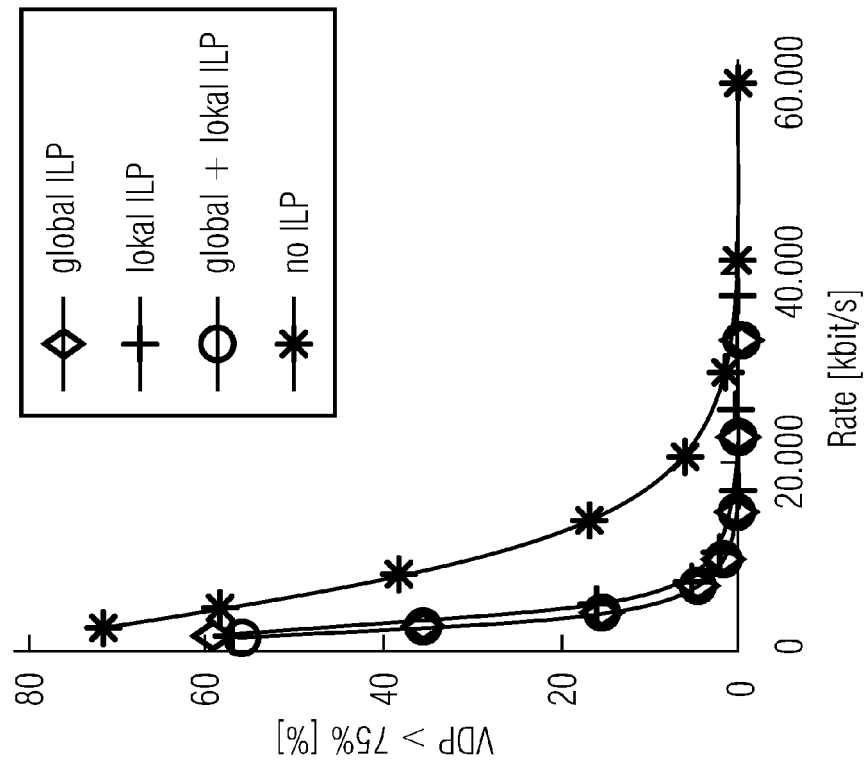
FIGS. 4a and 4b show different coding results.
Figure 4B:
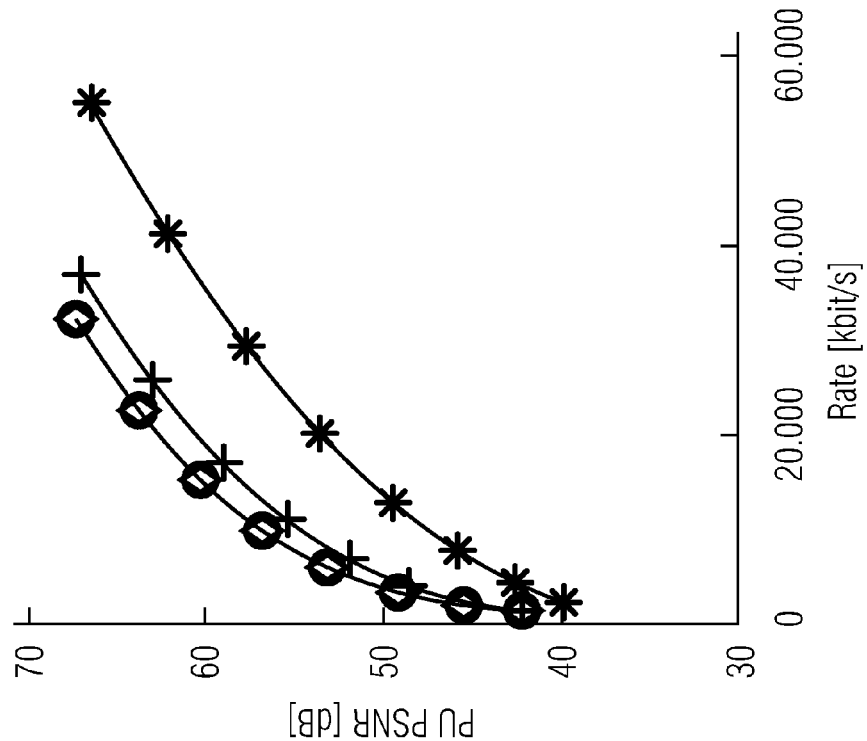

FIGS. 4a and 4b show the coding results for the Panorama test sequence when the LDR layer has been generated by TMO 6. In particular, the coding results for Panorama test sequence are given by PU PSNR (FIG. 4a) and HDR VDP (FIG. 4b) over bit rate. The 4 curves show the efficiency of global, local, and the joint global+local ILP (see 10 in FIGS. 1 and 2) method together with the reference case when no ILP is used (i.e., simulcast of LDR and HDR layer).

It can be seen, that the joint global+local ILP according to 10 in FIGS. 1 and 2 performs best, both, in terms of PU PSNR and HDR VDP quality metrics. Since during all our experiments the HDR VDP and PU PSNR results have been consistent, in the remainder, PU PSNR results are shown.

TABLE 1

Average coding gain for tunnel

| | Δ PSNR in dB | | | Δ rate in % | | |
| --- | --- | --- | --- | --- | --- | --- |
| | G | L | G + L | G | L | G + L |
| TMO 1 | 2.62 | 2.61 | 2.59 | −35.16 | −32.07 | −31.75 |
| TMO 2 | 3.91 | 3.85 | 3.53 | −49.46 | −45.79 | −41.61 |
| TMO 3 | 0.13 | 4.48 | 4.45 | −5.26 | −52.77 | −52.38 |
| TMO 4 | −1.53 | 2.44 | 2.41 | 24.93 | −31.72 | −31.21 |
| TMO 5 | 2.97 | 3.17 | 3.22 | −42.35 | −39.42 | −40.38 |
| TMO 6 | 4.12 | 3.76 | 4.17 | −55.26 | −46.24 | −51.31 |
| Avg. | 2.03 | 3.38 | 3.39 | −27.10 | −41.34 | −41.44 |

TABLE 2

Average coding gain for sun

| | Δ PSNR in dB | | | Δ rate in % | | |
| --- | --- | --- | --- | --- | --- | --- |
| | G | L | G + L | G | L | G + L |
| TMO 1 | 1.31 | 1.88 | 1.76 | −25.25 | −28.00 | −25.65 |
| TMO 2 | 2.41 | 2.22 | 2.61 | −38.69 | −32.89 | −37.51 |
| TMO 3 | −2.03 | 2.57 | 2.54 | 44.00 | −39.28 | −38.53 |
| TMO 4 | −3.43 | 1.52 | 1.49 | 81.68 | −24.08 | −23.45 |
| TMO 5 | 1.74 | 2.26 | 2.32 | −35.58 | −34.75 | −35.91 |
| TMO 6 | 2.87 | 2.54 | 2.94 | −49.86 | −37.73 | −43.25 |
| Avg. | 0.48 | 2.17 | 2.28 | −3.95 | −32.79 | −34.05 |

TABLE 3

Average coding gain for panorama

| | Δ PSNR in dB | | | Δ rate in % | | |
| --- | --- | --- | --- | --- | --- | --- |
| | G | L | G + L | G | L | G + L |
| TMO 1 | 5.62 | 5.90 | 5.58 | −48.63 | −49.66 | −47.73 |
| TMO 2 | 5.02 | 4.96 | 5.01 | −44.59 | −43.79 | −43.98 |
| TMO 3 | 1.55 | 7.26 | 7.23 | −16.85 | −56.06 | −55.85 |
| TMO 4 | 2.06 | 3.87 | 3.29 | −22.96 | −37.23 | −32.64 |
| TMO 5 | 7.43 | 6.23 | 7.44 | −59.28 | −52.25 | −58.49 |
| *TMO 6* | *8.60* | *6.83* | *8.58* | *−64.95* | *−56.11* | *−64.00* |
| Avg. | 5.05 | 5.84 | 6.19 | −42.88 | −49.18 | −50.45 |

Tables 1-3 display the average PU PSNR gain (Δ PSNR) or bit rate saving (Δ rate), respectively, for the 3 test sequences w.r.t. the simulcast case (i.e., no ILP). Averaging has been performed according to the Bjøntegaard metric [15]). Results for global (G), local (L), and the above-outlined joint (G+L) ILP are given in the tables for all TMOs under consideration. The entries in Table 3 that correspond to the R-D plot in FIGS. 4a and 4b are written in italics (TMO 6). The average values in the bottom row of the tables show that the embodiments of the present invention perform best, independently of the TMO that was used to generate the LDR sequence. Average bit rate savings of up to 50% or quality gains of up to 6 dB can be found in our results. It is worth noting, that in some cases the global ILP delivers slightly better results for some distinct TMOs than the joint ILP in accordance with the above embodiments, mainly because it entails less side information. However, for TMOs with a strong local adaptivity, this approach evidently fails: e.g., in Table 2 it can be seen that for TMO 3 and 4 the useful bit rate significantly exceeds the bit rate that may be used when LDR and HDR layers are coded independently (by 44% or 82%, respectively).

It is also worth noting that the gain in coding efficiency of the local+global ILP method presented hereinbefore, compared to the methods in the literature [2-6] should be even higher than the gain of G+L compared to L or G in Tables 1-3: in addition to a joint ILP strategy, the mixed ILP approach incorporates a suitable HDR color space, rate-distortion optimized parameter selection, and efficient coding of the ILP parameters.

Decoding Site

Figure 5:
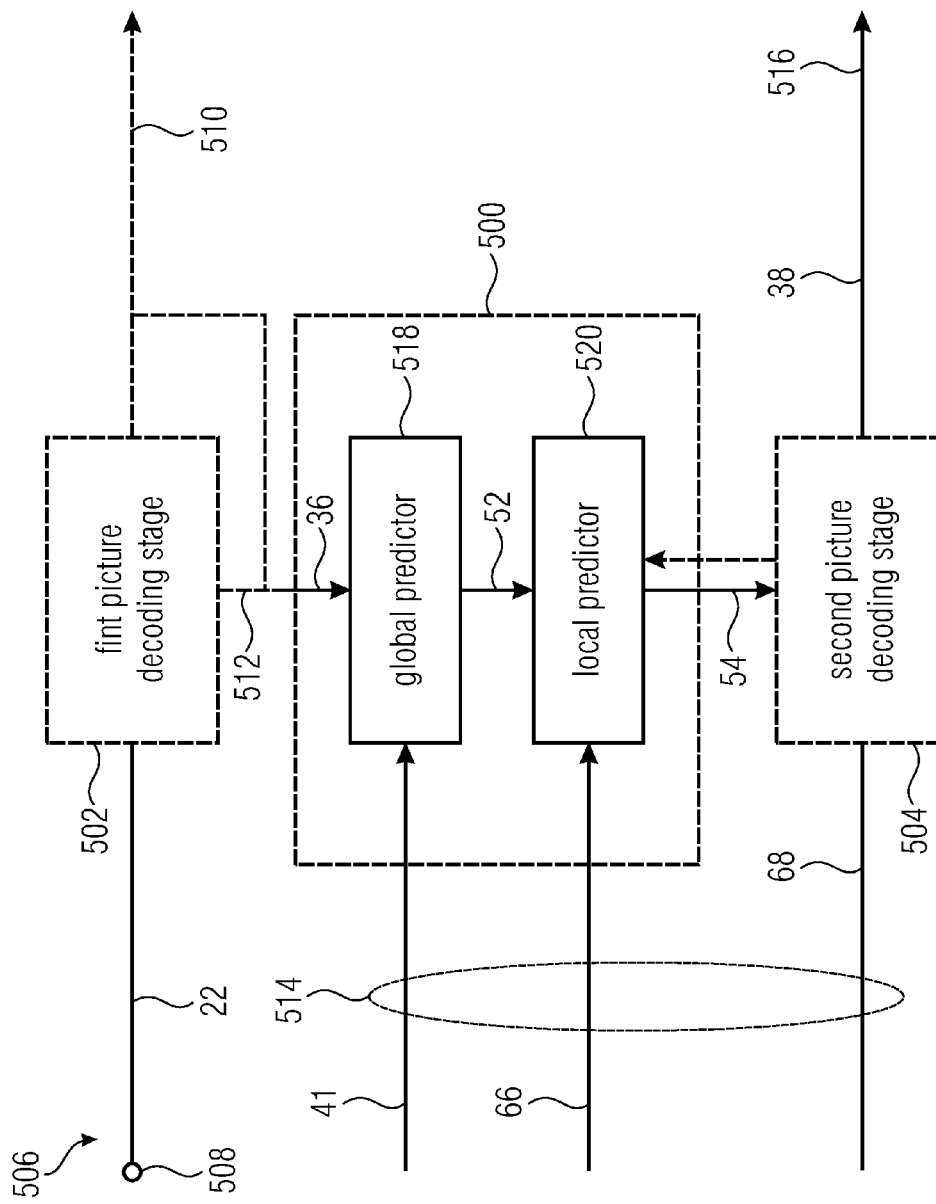
FIG. 5 shows a block diagram of an apparatus for performing inter-layer prediction at a decoding site fitting to the embodiment of FIG. 1, in accordance with an embodiment.

FIG. 5 shows an apparatus 500 for performing inter-layer prediction between a first picture decoding stage 502 for decoding a first tone-mapped version of a picture, having a first dynamic sample value range, and a second picture decoding stage 504 for decoding a second version of the picture having a second dynamic sample value range greater than the first dynamic sample value range. Insofar, FIG. 5 also shows a decoder 506 which is able to decode the picture in the second dynamic sample value range. To this end, the first picture decoding stage 502 is connected between an input 508 and an input of apparatus 500. The base-layer data stream 22 arrives at input 508. The first picture decoding stage 502 could optionally have two outputs, namely one for outputting a reconstructed picture in the first dynamic sample value range for a reproduction thereof, with this output indicated using reference sign 510 and a second output 512 for outputting an in-loop reconstruction result of the picture such as buffered in buffer 104 in FIG. 2. The input of apparatus 500 may be connected to any of these outputs. Further, output 510 is optional and may be left away. Additionally, the versions output at outputs 510 and 512 may be equal to each other or may differ from each other by way of an additional reproduction filter applied to obtain the version to be reproduced at output 510, compared to the version output at output 512.

The second picture decoding stage 504 is connected between an input 514 of decoder 506 and an output 516 of decoder 506 for outputting the high dynamic range picture. Apparatus 500 is also connected to input 515. To be more precise, the apparatus 500 comprises a concatenation of a global predictor 518 and local predictor 520 and second picture decoding stage 504 obtains the prediction residual 68 from the enhancement data stream while global and local predictors 518 and 520 receive the side information 41 and 66, respectively. At the output of local predictor 520, the reference picture 54 is obtained and output to the reference input of second picture decoding stage 504. Similar to the description of FIG. 1, the second picture decoding stage 504 may be configured to provide the local predictor 520, in turn, with access to previously reconstructed sub-portions of the current high dynamic range version of the currently decoded picture.

Thus, in operation, the first picture decoding stage 502 reconstructs the first tone-mapped version 36 of the picture from the base-layer data stream 22. The first tone-mapped version 36 thus obtained is, in accordance with advantageous embodiments, the same as inbound to global predictor 26 at the encoding side so that the coding loss which optionally takes place within the first picture coding stage 12 at the encoding side does not lead to deviations between encoder and decoder states/behavior.

The global predictor 518 is configured to derive the global tone-mapping function from the side information 41 of the enhancement data stream of the second picture decoding stage 504 and globally applies the global tone-mapping function onto the samples of the first tone-mapped version 36 of the picture to obtain the globally predicted reference picture 52. As the global tone-mapping function is very likely a monotonically and slowly varying function, the global predictor 26 of FIG. 1 may have been implemented to encode the global tone-mapping function sequentially along a direction of increasing or decreasing possible values of the first dynamic sample value range using differential coding, while global predictor 518, in turn, may be implemented to sequentially decode the global tone-mapping function along the same direction using differential decoding. Other possibilities exist as well as has been mentioned above.

Global predictor 518 may further be configured to, in deriving the global tone-mapping function and applying the global tone-mapping function onto the first tone-mapped version 36 of the picture, perform the color conversion 130 of FIG. 2 on the values of the samples in the first tone-mapped version 36 leading from the color format of data stream 22 to the color format of enhancement data stream 24 and decoding stage 504, respectively, the color conversion being constantly set independent of the first tone-mapped version 36 and the second version 38 of the picture as reconstructed by the second picture decoding stage 504, and then perform the actual application of the global tone-mapping function in the second color format.

To be more precise, the local predictor 518 reveals the global tone-mapping function 40 shown in FIG. 1 from the side information 41 and sets the sample values $x_{low}$ of the first tone-mapped version 36 of the picture to the value to which same is mapped in accordance with the tone-mapping function 40, i.e. $x_{glRef}(i)=f(x_{low}(i))$ for all sample positions i in the picture. The result is the globally predicted reference picture 52.

The local predictor 520 is configured to locally derive a locally varying tone-mapping function from the side information in units of the sub-portions 56 shown in FIG. 1 into which the globally predicted reference picture 52 and the second version 38 of the picture are partitioned, and apply the locally varying tone-mapping function onto the globally predicted reference picture 42 to obtain a globally and locally predicted reference picture 54.

As described above, the local predictor 520 may, in locally deriving the locally varying tone-mapping function, reconstruct for each sub-portion 56 a slope 58 and an intercept 60 from the side information 66, and, in applying the locally varying tone-mapping function onto the globally predicted reference picture, weight, for each sub-portion 56, the samples of the globally predicted reference picture 52 at the respective sub-portion 56 using the slope and adding the intercept to the product of slope ω and respective sample. That is, within each sub-portion 56, the local predictor 520 computes for each sample position within the respective sub-portion, $x_{glRef}(i) \cdot \omega + o = x_{gl+loRef}(i)$ for all sample positions I within a current sub-portion, where $x_{glRef}$ is the sample value at the respective sample position in the sub-portion of the global reference picture 52, $x_{gl+loRef}$ is the sample value computed for the co-located sample position within the same sub-portion 56 of the globally and locally predicted reference picture 54, w is the slope derived from the side information 66 for this sub-portion 56 and o is the intercept determined for this sub-portion 56 from the side information 66.

As already described above, the information concerning the slope w and the intercept o for the sub-portions 56 may efficiently be coded into the enhancement data stream and the side information 66, respectively. Accordingly, the local predictor 520 may be configured to sequentially derive the slope ω and the intercept o for the sub-portions 56 from the side information 66. As mentioned above, a row-wise raster scan order may be used in order to scan the sub-portions 56. However, other scans are also feasible. In any case, the local predictor 520 decodes, in accordance with the respective embodiment, slope and intercept residuals for the sub-portions 56 from the side information 66 and spatially predicts the slope w for a current sub-portion from the slope of a neighboring sub-portion 70 previously reconstructed, and reconstructs the slope w for the current sub-portion 56 based on the predicted slope and the slope residual for the current sub-portion. Then, the local predictor 520 fits a straight line 72 having the slope w of the current sub-portion just reconstructed, into a distribution of pairs of values of co-located samples in the neighboring sub-portion 70 of the second version of the picture as previously reconstructed, and the globally predicted reference picture 52 and determines the intercept 74 of the straight line 72. The local predictor 520 then reconstructs the intercept of the current sub-portion 56 based on the intercept prediction thus obtained and the intercept residual for the current sub-portion 56.

In particular, the interaction between local predictor 520 and decoding stage 504 may be as follows: the second picture decoding stage 504 finishes the reconstruction of a certain sub-portion of the picture version 38 to be reconstructed by deriving the prediction residual for this sub-portion from residual information 68 and combining same, such as by adding, with the globally and locally predicted reference picture at the co-located sub-portion thereof. The second picture decoding stage 504 then proceeds with reconstructing the next sub-portion in the afore-mentioned scan order among the sub-portions which is also used by local predictor 520. In particular, the local predictor 520 then decodes the slope and the intercept for this next sub-portion in line in the manner just described and in doing so, the local predictor 520 is able to perform the just-mentioned straight line fitting using the already reconstructed sample values in the neighboring sub-portion of picture version 38. After having decoded the slope and the intercept for the current sub-portion from side information 66 the local predictor 520 derives the globally and locally predicted picture at the current sub-portion 56 by weighting and shifting the co-located samples within the co-located sub-portion of the globally predicted picture 52 using the predictively decoded slope and intercept and the decoding stage 504 is able to reconstruct that current sub-portion using corresponding prediction residual derived from the enhancement data stream and residual information 68, respectively. By this measure, the local predictor 520 and the decoding stage 504 may operate alternatingly along the scan order among the sub-portions mentioned.

As also described above, the global predictor 518 may be configured to suppress the derivation and the application of the global tone-mapping function 40 responsive to a signaling in the side information 66, wherein the local predictor 520 may be configured to, in case of the suppression, perform the application onto the first tone-mapped version 36 of the picture rather than the globally predicted reference picture 52.

For the sake of completeness only, it is noted that all of the other details described with respect to the encoding side are, in a corresponding manner, transferrable onto the decoding example of FIG. 5. For example, the second decoding stage 504 may be configured to transform-decode the prediction residual 68 between the globally and locally predicted reference picture and the picture version 38 from the enhancement data stream and reconstruct the picture version 38 based on the prediction residual 68 and the globally and locally predicted reference picture such as by summing them.

Summarizing the above, a framework for the efficient coding of high dynamic range (HDR) video data has been presented by way of the above embodiments. Since the joint ILP scheme of the above embodiments is built on the scalable video coding extension of H.264/AVC it allows for backwards compatible coding. That is, a low dynamic range (LDR) video can be extracted, by cropping unnecessary parts from the encoded bit stream. A method for efficient inter-layer prediction has been proposed to reduce the associated redundancy of transmitting HDR and LDR information. It comprises a common HDR color space transform and a joint global and local prediction strategy as well as a rate-distortion optimized estimation of the prediction parameters and the efficient coding of the side information that may be used. The experiments have shown that the embodiments presented above offer superior coding results compared to frame-wise global or block-wise local prediction strategies, independently of the tone-mapping operator. Moreover, compared to an independent transmission of LDR and HDR information it can reduce the useful bit rate by up to 50%.

In other words, some of the above embodiments formed, and some are implementable as, an inter-layer prediction for backwards compatible high dynamic range video coding with SVC. In some embodiments, the backwards compatible high dynamic range video coding framework was based on H.264/AVC. It allows to extract a standard low dynamic range (LDR) as well as high dynamic range (HDR) video from one compressed bit stream. A joint global and local inter-layer prediction method is proposed to reduce the redundancy between the LDR and HDR layers. It is based on a common color space which can represent HDR video data perceptually lossless. It has been sown as to how the inter-layer prediction parameters can be estimated in a rate-distortion optimized way and efficiently encoded to reduce side information. The evaluations demonstrated that the framework performs best, compared to the state-of-the-art for arbitrary tone-mapping operators. W.r.t. simulcast it allows for up to 50% bit rate saving.

In even other words, above embodiments revealed a backwards compatible high dynamic range video coding scheme that allows to extract a standard low dynamic range (LDR) as well as high dynamic range (HDR) video from one compressed bit stream, where a joint global and local inter-layer prediction method reduces the redundancy between the LDR and HDR video layers. A common color space is used which represents HDR video data perceptually lossless. The inter-layer prediction parameters can be estimated in a rate-distortion optimized way and efficiently encoded to reduce side information.

Scalable coding for HDR video was proposed e.g. in references [2]-[6], but the following aspects of the joint ILP concept described in embodiments hereinbefore exceeds the state of the art:
 Inter-layer-prediction using combined global and local prediction
 Adaptive log Luv color space for HDR layer (see our invention 10F51658-IIS1)
 Method for determining rate-distortion optimal parameters for the inter-layer-prediction
 Method for efficient coding of the parameters for the inter-layer-prediction
  Global parameters: differentially encoded lookup table per frame, e.g. transmitted in the Picture Parameter Set (unfortunately already mentioned in [4], but may be the combination with the local parameters could be a claim)
  Local parameters: scale predicted from top and left macroblock, offset predicted from top and left and co-located base layer macroblock (other local neighbourhoods are possible as well, e.g. top-left and top-right macroblocks in addition, anyway, the claim should be agnostic of H.264 since the same principle applies to the coding units or transform units of the upcoming HEVC standard)

Computer Program Implementation

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] E. Reinhard, G. Ward, S. N. Pattanaik, P. E. Debevec, W. Heidrich, and K. Myszkowski, *High Dynamic Range Imaging—Acquisition, Display, and Image-Based Lighting* (2. ed.). 1em plus 0.5em minus 0.4em Academic Press, 2010.

[2] R. Mantiuk, A. Efremov, K. Myszkowski, and H.-P. Seidel, "Backward compatible high dynamic range mpeg video compression," *ACM Trans. Graph.*, vol. 25, pp. 713-723, July 2006.

[3] S. Liu, W.-S. Kim, and A. Vetro, "Bit-depth scalable coding for high dynamic range video," in *Proc. SPIE* 6822, 68220O (2008), 2008.

[4] M. Winken, D. Marpe, H. Schwarz, and T. Wiegand, "Bit-depth scalable video coding," in *Intl. Conf on Image Proc. (ICIP)*, San Antonio, USA, October 2007.

[5] A. Segall, "Scalable coding of high dynamic range video," in *Intl. Conf on Image Proc. (ICIP)*, San Antonio, USA, October 2007.

[6] Y. Gao, Y. Wu, and Y. Chen, "H.264/Advanced Video Coding (AVC) backward-compatible bit-depth scalable coding," *IEEE Trans. on Circ. and Syst. for Video Techn.*, vol. 19, no. 4, pp. 500-510, April 2009.

[7] J.-U. Garbas and H. Thoma, "Temporally coherent luminance-to-luma mapping for high dynamic range video coding with H.264/AVC," in *Intl. Conf on Acous., Speech and Signal Proc. (ICASSP)*, May 2011, pp. 829-832.

[8] G. W. Larson, "The Log Luv encoding for full gamut, high dynamic range images," *Journal of Graph. Tools*, vol. 3, no. 1, pp. 15-31, 1998.

[9] *ITU-R rec. BT.709, basic parameter values for the HDTV standard for the studio and for international programme exchange*, Geneva, 1990.

[10] G. Krawczyk and R. Mantiuk, "pfstmo tone mapping library," http://pfstools.sourceforge.net/pfstmo.html=0pt

[11] S. Steuerwald and A. Waggershauser, "Sample panorama image: Florist Shop." http://www.lizardq.com/edn/sample_images/3-Florist-Shop.hdr=0pt

[12] G. Krawczy, "HDR video environment maps samples," http://www.mpi-inf.mpg.de/resources/hdr/video/, Max-Planck Institute for Informatics.

[13] R. Mantiuk, S. Daly, K. Myszkowski, and H.-P. Seidel, "Predicting visible differences in high dynamic range images—model and its calibration," in *Human Vision and Electronic Imaging X*, Proc. of SPIE, vol. 5666, 2005, pp. 204-214.

[14] T. O. Aydn, R. Mantiuk, and H.-P. Seidel, "Extending quality metrics to full dynamic range images," in *Human Vision and Electronic Imaging XIII*, Proc. of SPIE, San Jose, USA, January 2008, pp. 6806-6810.

[15] G. Bjøntegaard, "Calculation of average PSNR differences between RD-curves," in *ITU-T SG 16 Q. 6 Video Coding Experts Group (VCEG), document VCEG-M33*, Austin, USA, April 2001.

The invention claimed is:

1. An apparatus for performing inter-layer prediction between a first picture coding stage for coding a first tone-mapped version of a picture, comprising a first dynamic sample value range, and a second picture coding stage for coding a second version of the picture, comprising a second dynamic sample value range greater than the first dynamic sample value range, the apparatus comprising:
a global predictor configured to derive a global tone-mapping function based on a statistical analysis of pairs of values of co-located samples in the first tone-mapped version and the second version of the picture, and apply the global tone-mapping function onto the first tone-mapped version of the picture so as to achieve a globally predicted reference picture for the second version of the picture; and a local predictor configured to locally derive a locally varying tone-mapping function based on a statistical analysis of values of co-located samples in the second version of the picture and the globally predicted reference picture in units of sub-portions into which the globally predicted reference picture and the second version of the picture are partitioned, and apply the locally varying tone-mapping function onto the globally predicted reference picture so as to achieve a globally and locally predicted reference picture for the second version of the picture, wherein the local predictor is configured to, in locally deriving the locally varying tone-mapping function, for each sub-portion, determine a slope and an intercept of a regression line through a distribution of pairs of values of co-located samples in the respective sub-portion of the second version of the picture and the globally predicted reference picture, and encode the slope and the intercept determined for the sub-portions as side information into an enhancement datastream generated by the second picture coding stage, and forming an enhancement layer relative to a datastream output by the first picture coding stage, and wherein the second picture coding stage is configured to lossy code a prediction residual between the globally and locally predicted reference picture and the second version of the picture into an enhancement datastream, and the local predictor is configured to encode the slope determined for the respective sub-portion as a prediction residual of a spatial prediction from the slope of a neighboring sub-portion the slope of which has been previously encoded, fit a straight line comprising the slope of the respective sub-portion, into a distribution of pairs of values of co-located samples in the neighboring sub-portion of the second version of the picture as far as reconstructible based on the prediction residual and the globally and locally predicted reference picture on the one hand, and the globally predicted reference picture on the other hand and determine the intercept of the straight line; and encode the intercept of the respective sub-portion as a prediction residual relative to a spatial intercept prediction depending on the intercept of the straight line.

2. The apparatus according to claim 1, wherein the global predictor is configured to derive the global tone-mapping function by, for each of possible values of the first dynamic sample value range, a central tendency of a distribution of the values of the samples in the second version of the picture, which are co-located to samples in the first tone-mapped version of the picture, the value of which equals the respective possible value.

3. The apparatus according to claim 2, wherein the global predictor is configured such that the central tendency is a mean value such as an arithmetic mean value.

4. The apparatus according to claim 1, wherein the global predictor is configured to, in deriving the global tone-mapping function and applying the global tone-mapping function onto the first tone-mapped version of the picture, perform a color conversion on the values of the samples in the first tone-mapped version of the picture from a first color format to a second color format, the color conversion being constantly set independent from the first tone-mapped version and the second version of the picture, and then perform the derivation of the global tone-mapping function and the application of the global tone-mapping function in the second color format.

5. The apparatus according to claim 4, wherein the global predictor is configured such that the second color format comprises a luma component which is logarithmically related to a luminance.

6. The apparatus according to claim 1, wherein the global predictor is configured to encode the global tone-mapping function as side information into an enhancement datastream generated by the second picture coding stage, and forming an enhancement layer relative to a datastream output by the first picture coding stage.

7. The apparatus according to claim 6, wherein the global predictor is configured to encode the global tone-mapping function sequentially along a direction of increasing or decreasing possible values of the first dynamic sample value range using differential coding.

8. The apparatus according to claim 1, wherein the local predictor is configured to quantize the slope and the intercept by minimizing a cost function which depends on the respective sub-portion of the second version of the picture and the respective sub-portion of the globally predicted reference picture having its samples weighted by the slope and shifted by the intercept.

9. The apparatus according to claim 1, wherein the local predictor is configured to quantize the slope and the intercept by minimizing a cost function which monotonically increases with a data rate needed by, and monotonically increases with a distortion caused by, the second picture coding stage for coding a deviation between the respective sub-portion of the second version of the picture and the respective sub-portion of the globally predicted reference picture having its samples weighted by the slope and shifted by the intercept.

10. The apparatus according to claim 1 wherein the global predictor is configured to suppress the application of the global tone-mapping function in case of a sum of variances of distributions of the pairs of the values of the co-located samples in the first tone-mapped version of the picture and the second version of the picture around the global tone-mapping function exceeding a predetermined threshold, wherein the local predictor is configured to, in case of the suppression, perform the local derivation and the application onto the first tone-mapped version of the picture rather than the globally predicted reference picture.

11. The apparatus according to claim 10 wherein the global predictor is configured to signal the suppression of the application of the global tone-mapping function as side information within an enhancement datastream generated by the second picture coding stage, and forming an enhancement layer relative to a datastream output by the first picture coding stage.

12. The apparatus according to claim 1 wherein the samples in the first tone-mapped version of the picture are integers of bit length m and samples of the second version of the picture are of bit length n, with n>m.

13. The apparatus according to claim 1 wherein the picture is a picture of a video and the first picture coding stage is a hybrid video coder configured to encode the first tone-mapped version onto a datastream.

14. The apparatus according to claim 1 wherein the second coding stage is configured to transform code a prediction residual between the globally and locally predicted reference picture and the second version of the picture into an enhancement datastream.

15. An apparatus for performing inter-layer prediction between a first picture decoding stage for decoding a first tone-mapped version of a picture, comprising a first dynamic sample value range, and a second picture decoding stage for decoding a second version of the picture, comprising a second dynamic sample value range greater than the first dynamic sample value range, the apparatus comprising:
   a global predictor configured to derive a global tone-mapping function from side information of an enhancement datastream of the second picture decoding stage and globally apply the global tone-mapping function onto samples of the first tone-mapped version of the picture so as to achieve a globally predicted reference picture for the second version of the picture; and
   a local predictor configured to locally derive a locally varying tone-mapping function from the side information in units of sub-portions into which the globally predicted reference picture and the second version of the picture are partitioned, and apply the locally varying tone-mapping function onto the globally predicted reference picture so as to achieve a globally and locally predicted reference picture for the second version of the picture,
wherein the local predictor is configured to,
in locally deriving the locally varying tone-mapping function, reconstruct, for each sub-portion, a slope and an intercept from the side information, and
in applying the locally varying tone-mapping function onto the globally predicted reference picture, weight, for each sub-portion, samples of the globally predicted reference picture in the respective sub-portion using the slope and adding the intercept to same,
   wherein the local predictor is configured to sequentially derive the slope and the intercept for the sub-portions from the side information by
decoding slope and intercept residuals for the sub-portions from the side information,
spatially predicting the slope for a current sub-portion from the slope of a neighboring sub-portion previously reconstructed to achieve a slope prediction;
reconstructing the slope for the current sub-portion based on the slope prediction and the slope residual for the current sub-portion;
fitting a straight line comprising the slope of the current sub-portion, into a distribution of pairs of values of co-located samples in the neighboring sub-portion of the second version of the picture and the globally predicted reference picture and determine the intercept of the straight line to achieve an intercept prediction; and
reconstructing the intercept of the current sub-portion based on the intercept prediction and the intercept residual for the current sub-portion.

16. The apparatus according to claim 15, wherein the global predictor is configured to, in deriving the global tone-mapping function and applying the global tone-mapping function onto the first tone-mapped version of the picture, perform a color conversion on the values of the samples in the first tone-mapped version of the picture from a first color format to a second color format, the color conversion being constantly set independent from the first tone-mapped version and the second version of the picture, and then perform the application of the global tone-mapping function in the second color format.

17. The apparatus according to claim 16, wherein the global predictor is configured such that the second color format comprises a luma component which is logarithmically related to a luminance.

18. The apparatus according to claim 15, wherein the global predictor is configured to decode the global tone-mapping function from the side information sequentially along a direction of increasing or decreasing possible values of the first dynamic sample value range using differential decoding.

19. The apparatus according to claim 15 wherein the global predictor is configured to suppress the derivation and the application of the global tone-mapping function responsive to a signaling in the side information, wherein the local predictor is configured to, in case of the suppression, perform the application onto the first tone-mapped version of the picture rather than the globally predicted reference picture.

20. The apparatus according to claim 15 wherein the samples in the first tone-mapped version of the picture are integers of bit length m and samples of the second version of the picture are of bit length n, with n>m.

21. The apparatus according to claim 15 wherein the picture is a picture of a video and the first picture decoding stage is a hybrid video decoder configured to decode the first tone-mapped version from a datastream.

22. The apparatus according to claim 15 wherein the second decoding stage is configured to transform-decode a prediction residual between the globally and locally predicted reference picture and the second version of the picture from the enhancement datastream and reconstruct the second version of the picture based on the prediction residual and the globally and locally predicted reference picture.

23. A method for performing inter-layer prediction between a first picture coding stage for coding a first tone-mapped version of a picture, comprising a first dynamic sample value range, and a second picture coding stage for coding a second version of the picture, comprising a second dynamic sample value range greater than the first dynamic sample value range, the method comprising:
   deriving a global tone-mapping function based on a statistical analysis of pairs of values of co-located samples in the first tone-mapped version and the second version of the picture;
   applying the global tone-mapping function onto the first tone-mapped version of the picture so as to achieve a globally predicted reference picture for the second version of the picture;
   locally deriving a locally varying tone-mapping function based on a statistical analysis of values of co-located samples in the second version of the picture and the globally predicted reference picture in units of sub-portions into which the globally predicted reference picture and the second version of the picture are partitioned, and
   applying the locally varying tone-mapping function onto the globally predicted reference picture so as to achieve a globally and locally predicted reference picture for the second version of the picture,
   wherein the local derivation of the locally varying tone-mapping function, comprises, for each sub-portion, determining a slope and an intercept of a regression line through a distribution of pairs of values of co-located samples in the respective sub-portion of the second version of the picture and the globally predicted reference picture,
and the method further comprises encoding the slope and the intercept determined for the sub-portions as side information into an enhancement datastream generated by the second picture coding stage, and forming an enhancement layer relative to a datastream output by the first picture coding stage, and wherein the second picture coding stage comprises lossy coding a prediction residual between the globally and locally predicted reference picture and the second version of the picture into an enhancement datastream, and the encoding the slope and the intercept comprises encoding the slope determined for the respective sub-portion as a prediction residual of a spatial prediction from the slope of a neighboring sub-portion the slope of which has been previously encoded, fitting a straight line comprising the slope of the respective sub-portion, into a distribution of pairs of values of co-located samples in the neighboring sub-portion of the second version of the picture as far as reconstructible based on the prediction residual and the globally and locally predicted reference picture on the one hand, and the globally predicted reference picture on the other hand and determine the intercept of the straight line; and encoding the intercept of the respective sub-portion as a prediction residual relative to a spatial intercept prediction depending on the intercept of the straight line.

24. A method for performing inter-layer prediction between a first picture decoding stage for decoding a first tone-mapped version of a picture, comprising a first dynamic sample value range, and a second picture decoding stage for decoding a second version of the picture, comprising a second dynamic sample value range greater than the first dynamic sample value range, the method comprising:

deriving a global tone-mapping function from side information of an enhancement datastream of the second picture decoding stage;

globally applying the global tone-mapping function onto samples of the first tone-mapped version of the picture so as to achieve a globally predicted reference picture for the second version of the picture;

locally deriving a locally varying tone-mapping function from the side information in units of sub-portions into which the globally predicted reference picture and the second version of the picture are partitioned, and applying the locally varying tone-mapping function onto the globally predicted reference picture so as to achieve a globally and locally predicted reference picture for the second version of the picture, wherein the local derivation of the locally varying tone-mapping function comprises reconstructing, for each sub-portion, a slope and an intercept from the side information, and the application of the locally varying tone-mapping function onto the globally predicted reference picture, comprises weighting, for each sub-portion, samples of the globally predicted reference picture in the respective sub-portion using the slope and adding the intercept to same, wherein the method comprises sequentially deriving the slope and the intercept for the sub-portions from the side information by decoding slope and intercept residuals for the sub-portions from the side information, spatially predicting the slope for a current sub-portion from the slope of a neighboring sub-portion previously reconstructed to achieve a slope prediction;

reconstructing the slope for the current sub-portion based on the slope prediction and the slope residual for the current sub-portion;

fitting a straight line comprising the slope of the current sub-portion, into a distribution of pairs of values of co-located samples in the neighboring sub-portion of the second version of the picture and the globally predicted reference picture and determine the intercept of the straight line to achieve an intercept prediction; and reconstructing the intercept of the current sub-portion based on the intercept prediction and the intercept residual for the current sub-portion.

25. A computer program for performing, when running on a computer, the method of claim 23.

26. A computer program for performing, when running on a computer, the method of claim 24.

* * * * *